United States Patent
Shi et al.

(10) Patent No.: US 12,225,424 B2
(45) Date of Patent: Feb. 11, 2025

(54) LINK FAILURE REPORT TRANSMISSION METHOD AND APPARATUS

(71) Applicant: Huawei Technologies Co., Ltd., Shenzhen (CN)

(72) Inventors: Xiaoli Shi, Shanghai (CN); Henrik Olofsson, Kista (SE); Hongzhuo Zhang, Shanghai (CN); Rui Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 445 days.

(21) Appl. No.: 17/651,168

(22) Filed: Feb. 15, 2022

(65) Prior Publication Data

US 2022/0174572 A1 Jun. 2, 2022

Related U.S. Application Data

(63) Continuation of application No. PCT/CN2020/109261, filed on Aug. 14, 2020.

(30) Foreign Application Priority Data

Aug. 16, 2019 (CN) .......................... 201910760886.2

(51) Int. Cl.
*H04W 36/30* (2009.01)
*H04W 36/00* (2009.01)
*H04W 36/08* (2009.01)

(52) U.S. Cl.
CPC ..... *H04W 36/305* (2018.08); *H04W 36/0058* (2018.08); *H04W 36/0079* (2018.08);
(Continued)

(58) Field of Classification Search
CPC ........... H04W 36/305; H04W 36/0079; H04W 36/0058; H04W 36/08
See application file for complete search history.

(56) References Cited

U.S. PATENT DOCUMENTS 8,929,894 B2 * 1/2015 Catovic ............. H04W 36/0094
370/242
9,521,594 B2 * 12/2016 Han .................. H04W 36/0058
(Continued)

FOREIGN PATENT DOCUMENTS

CN 103179601 A 6/2013
CN 105103593 A 11/2015
(Continued)

OTHER PUBLICATIONS

Mediatek Inc., "RLF Report in NR", 3GPP TSG RAN WG2 Meeting #101bis, R2-1804612, Apr. 16-20, 2018, 4 pages, Sanya, China.
(Continued)

*Primary Examiner* — Jael M Ulysse
(74) *Attorney, Agent, or Firm* — Slater Matsil, LLP

(57) ABSTRACT

A link failure report transmission method and apparatus are provided. When a link between a terminal and a first radio access network device fails, and a master radio access network device of the first radio access network device is handed over, the terminal sends a first link failure report to a second radio access network device, so that the second radio access network device forwards the first link failure report to a third radio access network device, and the third radio access network device sends the first link failure report to the first radio access network device. In this way, the first radio access network device can perform parameter adjustment based on the first link failure report.

20 Claims, 12 Drawing Sheets

(52) U.S. Cl.
CPC ........... *H04W 36/00835* (2018.08); *H04W 36/00837* (2018.08); *H04W 36/087* (2023.05); *H04W 36/00698* (2023.05); *H04W 36/00838* (2023.05)

(56) References Cited

U.S. PATENT DOCUMENTS

| | | | | |
|---|---|---|---|---|
| 9,730,090 | B2* | 8/2017 | Johansson | H04W 24/04 |
| 11,133,978 | B2* | 9/2021 | Tang | H04L 41/0668 |
| 2011/0039546 | A1* | 2/2011 | Narasimha | H04W 36/305 |
| | | | | 455/67.11 |
| 2012/0069732 | A1* | 3/2012 | Xu | H04W 36/0058 |
| | | | | 370/242 |
| 2013/0260745 | A1* | 10/2013 | Johansson | H04W 36/144 |
| | | | | 455/423 |
| 2015/0092746 | A1* | 4/2015 | Jang | H04W 36/0094 |
| | | | | 370/331 |
| 2015/0131454 | A1* | 5/2015 | Wegmann | H04W 24/10 |
| | | | | 370/242 |
| 2015/0195758 | A1* | 7/2015 | Kim | H04W 24/10 |
| | | | | 370/252 |
| 2015/0334607 | A1* | 11/2015 | Singh | H04W 36/0079 |
| | | | | 455/437 |
| 2015/0382265 | A1* | 12/2015 | Da Silva | H04W 24/08 |
| | | | | 455/423 |
| 2016/0338137 | A1* | 11/2016 | Mishra | H04W 36/00692 |
| 2017/0171788 | A1* | 6/2017 | Won | H04W 24/02 |
| 2017/0171903 | A1* | 6/2017 | Kubota | H04W 48/16 |
| 2017/0230232 | A1* | 8/2017 | Liu | H04W 24/10 |
| 2017/0318504 | A1* | 11/2017 | Zhang | H04W 36/0027 |
| 2018/0070259 | A1* | 3/2018 | Lee | H04L 1/187 |
| 2018/0279401 | A1* | 9/2018 | Hong | H04W 36/0064 |
| 2018/0302934 | A1* | 10/2018 | Chisu | H04W 76/18 |
| 2019/0053135 | A1* | 2/2019 | Hahn | H04W 48/16 |
| 2019/0215756 | A1* | 7/2019 | Park | H04W 24/10 |
| 2019/0289510 | A1 | 9/2019 | Rugeland et al. | |
| 2020/0037213 | A1* | 1/2020 | Chen | H04W 36/0079 |
| 2020/0067762 | A1* | 2/2020 | Tang | H04W 36/305 |
| 2021/0084707 | A1* | 3/2021 | Escott | H04W 36/0079 |
| 2022/0022058 | A1* | 1/2022 | Fang | H04W 76/25 |
| 2022/0141725 | A1* | 5/2022 | Parichehrehteroujeni | |
| | | | | H04W 36/0083 |
| | | | | 370/331 |

FOREIGN PATENT DOCUMENTS

| | | |
|---|---|---|
| CN | 105684491 A | 6/2016 |
| CN | 108632902 A | 10/2018 |
| CN | 109691169 A | 4/2019 |
| CN | 110012554 A | 7/2019 |
| CN | 110022588 A | 7/2019 |
| CN | 111030786 A | 4/2020 |
| CN | 111246499 A | 6/2020 |
| IN | 107690162 A | 2/2018 |
| NO | 2018231115 A1 | 12/2018 |
| WO | 2015017975 A1 | 2/2015 |
| WO | 2018128572 A1 | 7/2018 |
| WO | 2019028747 A1 | 2/2019 |

OTHER PUBLICATIONS

Mediatek Inc., "[M156] Need of RLF Report in NR", 3GPP TSG-RAN WG2 Meeting #103, R2-1811117, Aug. 20-24, 2018, 3 pages, Gothenburg, Sweden.

3GPP Ts 36.331 V15.6.0 (Jun. 2019), 3rd Generation Partnership Project; Technical Specification Group Radio Access Network; Evolved Universal Terrestrial Radio Access (E-UTRA); Radio Resource Control (RRC); Protocol specification (Release 15), 960 pages.

CMCC, "Status report for SI on RAN-centric data collection and utilization for LTE and NR", 3GPP TSG RAN meeting #84, RP-191223, Jun. 3-7, 2019, 16 pages, Newport Beach, California.

3GPP TS 25.413 V15.0.0 (Jun. 2018), 3rd Generation Partnership Project; Technical Specification Group Radio Access Network; UTRAN Iu interface, Radio Access Network Application Part (RANAP) signalling(Release 15), 455 pages.

Huawei (Rapporteur), "Report and summary of email discussion [87#22] [LTE/DC] S-RLF and Reestablishment", 3GPP TSG-RAN WG2 Meeting #87, R2-144540, Oct. 6-10, 2014, 29 pages, Shanghai, China.

Fiberhome, "radio link problem on SCG in Dual Connectivity", 3GPP TSG-RAN WG2 Meeting #87bis, R2-144391, Oct. 6-Oct. 10, 2014, 5 pages, Shanghai, China.

Vivo, "UE behavior upon SCell-failure of PDCP duplication", 3GPP TSG-RAN WG2 Meeting #101, R2-1802081, Feb. 26-Mar. 2, 2018, 5 pages, Athens, Greece.

Samsung Electronics, "Introduction of RLF report in SA", 3GPP TSG-RAN WG2 #103, R2-1812698, Aug. 20-24, 2018, 20 pages, Gothenburg, Sweden.

* cited by examiner

LINK FAILURE REPORT TRANSMISSION METHOD AND APPARATUS

CROSS-REFERENCE TO RELATED APPLICATIONS

This application is a continuation of International Application No. PCT/CN2020/109261, filed on Aug. 14, 2020, which claims priority to Chinese Patent Application No. 201910760886.2, filed on Aug. 16, 2019. The disclosures of the aforementioned applications are hereby incorporated by reference in their entireties.

TECHNICAL FIELD

This application relates to the communication field, and more specifically, to a link failure report transmission method and apparatus.

BACKGROUND

In a terminal moving scenario, setting an inappropriate handover parameter deteriorates user experience, and network resources are wasted due to a ping-pong handover, a handover failure, and a radio link failure. The radio link failure caused by the inappropriate handover parameter affects user experience and the network resources.

Currently, in a long term evolution (LTE) system, manually setting a system handover parameter is time-consuming, and updating a mobility parameter after initial network deployment is quite costly. In some cases, radio resource management (RRM) in an evolved NodeB (eNB) can detect a problem and adjust the mobility parameter. However, in some cases, the RRM cannot resolve the problem. Therefore, an automatic optimization scenario, namely, mobility robust optimization (MRO), of the mobility parameter is proposed.

In the LTE system, the MRO optimization is mainly used to optimize the mobility parameter. Specifically, the MRO is mainly used to determine, based on a radio link failure (RLF) report reported by a terminal, an RLF indication exchanged over an interface, and a handover (HO) report, whether the mobility parameter needs to be optimized.

However, in a dual connectivity (DC) scenario, when a link between the terminal and a secondary node (SN) fails, and a master node (MN) is handed over, a link failure report of the terminal cannot be sent to the SN. As a result, the SN cannot perform parameter adjustment.

SUMMARY

This application provides a link failure report transmission method and apparatus. A terminal can send a link failure report to an SN, so that the SN performs parameter adjustment, to improve communication efficiency.

According to a first aspect, a link failure report transmission method is provided. The method includes: A terminal sends a first link failure report to a second radio access network device, where the first link failure report is used to indicate that a link between the terminal and a first radio access network device fails, and the first radio access network device is a secondary radio access network device of a third radio access network device.

When the link between the terminal and the first radio access network device fails, and a master radio access network device of the first radio access network device is handed over, the terminal sends the first link failure report to the second radio access network device, so that the second radio access network device forwards the first link failure report to the third radio access network device, and the third radio access network device sends the first link failure report to the first radio access network device. In this way, the first radio access network device can perform parameter adjustment based on the first link failure report. Therefore, communication efficiency in a dual connectivity scenario is improved.

In some possible implementations, that a terminal sends a first link failure report to a second radio access network device includes: The terminal sends the first link failure report to the second radio access network device when the terminal is successfully handed over from the third radio access network device to the second radio access network device.

The third radio access network device may actively send an access network device handover. For example, the third radio access network device sends a handover command to the terminal, where the handover command may indicate the terminal to be handed over from the third radio access network device to the second radio access network device. The terminal is successfully handed over to the second radio access network device according to the handover command. If the link between the terminal and the first radio access network device is faulty, the terminal sends the first link failure report to the second radio access network device, so that the second radio access network device forwards the first link failure report to the third radio access network device, and the third radio access network device sends the first link failure report to the first radio access network device. In this way, the first radio access network device can perform the parameter adjustment based on the first link failure report. Therefore, the communication efficiency in the dual connectivity scenario is improved.

In some possible implementations, that a terminal sends a first link failure report to a second radio access network device includes: The terminal sends the first link failure report to the second radio access network device when the terminal successfully reestablishes a connection to the second radio access network device.

When the terminal does not receive a handover command and detects that a link between the terminal and the third radio access network device fails, the terminal reselects an access network device (namely, the second radio access network device), establishes the connection to the second radio access network device, and then sends the first link failure report the second radio access network device. In other words, this embodiment of this application may be applied to a "delayed handover" scenario, to improve the communication efficiency.

In some possible implementations, that a terminal sends a first link failure report to a second radio access network device includes: The terminal sends the first link failure report to the second radio access network device when the terminal is successfully handed over from the third radio access network device to a fourth radio access network device and a link between the terminal and the fourth radio access network device fails within a preset time interval.

The third radio access network device may actively perform a radio access network device handover, and send a handover command to the terminal. The terminal is handed over from the third radio access network device to the fourth radio access network device according to the handover command, but the link between the terminal and the fourth radio access network device fails within a short time period (namely, the preset time interval). In this way, the terminal reselects an access network device (namely, the second radio access network device), establishes a connection to the second radio access network device, and then sends the first link failure report to the second radio access network device, so that the second radio access network device forwards the first link failure report to the third radio access network device, and the third radio access network device sends the first link failure report to the first radio access network device. In this way, the first radio access network device can perform the parameter adjustment based on the first link failure report. Therefore, the communication efficiency in the dual connectivity scenario is improved.

In some possible implementations, that a terminal sends a first link failure report to a second radio access network device includes: The terminal sends the first link failure report to the second radio access network device when the terminal fails to be handed over from the third radio access network device to a fourth radio access network device.

The third radio access network device may actively perform a radio access network device handover, and send a handover command to the terminal. The terminal is handed over from the third radio access network device to the fourth radio access network device according to the handover command. If the terminal fails to be handed over from the third radio access network device to the fourth radio access network device, the terminal reselects an access network device (namely, the second radio access network device), establishes a connection to the second radio access network device, and then sends the first link failure report to the second radio access network device, so that the second radio access network device forwards the first link failure report to the third radio access network device, and the third radio access network device sends the first link failure report to the first radio access network device. In this way, the first radio access network device can perform the parameter adjustment based on the first link failure report. Therefore, the communication efficiency in the dual connectivity scenario is improved.

In some possible implementations, the second radio access network device and the third radio access network device are a same access network device.

If the second radio access network device and the third radio access network device are not the same radio access network device, a scenario in which the terminal is handed over from the third radio access network device to the fourth radio access network device according to the handover command, but the link between the terminal and the fourth radio access network device fails within the short time period (namely, the preset time interval) may be referred to as a "handover to an incorrect cell". If the second radio access network device and the third radio access network device are the same radio access network device, this application scenario may be referred to as a "premature handover". In other words, this embodiment of this application may be applied to a plurality of application scenarios, to improve application flexibility.

In some possible implementations, the method further includes: The terminal sends a second link failure report to the second radio access network device, where the second link failure report is used to indicate that the link between the terminal and the fourth radio access network device fails.

The terminal is handed over from the third radio access network device to the fourth radio access network device according to the handover command sent by the third radio access network device. If the handover fails or a failure occurs within the short time period after the handover, the terminal may further send the second link failure report to the second radio access network device to which the connection is reestablished, so that the second radio access network device sends the second link failure report to the third radio access network device. In this way, the third radio access network device adjusts a handover parameter, and a more appropriate radio access network device can be selected as a target radio access network device to be handed over.

In some possible implementations, that the terminal sends a second link failure report to the second radio access network device includes: The terminal sends a first message to the second radio access network device, where the first message includes the first link failure report and the second link failure report.

The terminal may send the first link failure report and the second link failure report to the second radio access network device by using one message, where the first link failure report and the second link failure report are respectively used as different sub-elements in the message. Therefore, resource overheads are reduced.

In some possible implementations, the second link failure report includes: cell information of a first cell, where the first cell is within coverage of the fourth radio access network device, and a link failure occurs between the terminal and the first cell; a type of the link failure that occurs in the first cell; cell information of a primary cell of a cell in which a connection failure occurs or cell information of a cell in which the handover command is received for the last time; cell information of a cell that is served by a radio access network device and in which the terminal successfully reestablishes a connection; a time interval between a moment at which the link between the terminal and the first radio access network device fails and a moment at which the link between the terminal and the fourth radio access network device fails; a time interval between the moment at which the link between the terminal and the fourth radio access network device fails and a moment at which a link between the terminal and the second radio access network device is successfully established; a time interval between a moment at which the handover command is received and the moment at which the link between the terminal and the fourth radio access network device fails; an identifier of the terminal; and a result of measurement between a neighboring cell of the first cell and the terminal.

The third radio access network device may adjust the handover parameter based on specific content of the second link failure report, and a more appropriate radio access network device can be selected as the target radio access network device to be handed over, thereby further improving the communication efficiency.

In some possible implementations, the first link failure report includes at least one of the following: cell information of a second cell, where the second cell is within coverage of the first radio access network device, and a link failure occurs between the terminal and the second cell; a type of the link failure that occurs in the second cell; cell information of a cell covered by a master access network device corresponding to the second cell; a time interval between the moment at which the link between the terminal and the first radio access network device fails and a moment at which the terminal is handed over from the third radio access network device to the second radio access network device; the identifier of the terminal; location information of the terminal; a result of measurement between the terminal and each primary cell in a master cell group; and a result of measurement between the terminal and each secondary cell in a secondary cell group.

The first link failure report is sent to the first radio access network device, and the first radio access network device may more accurately perform the parameter adjustment based on specific content of the first link failure report, to further improve the communication efficiency in the dual connectivity scenario.

In some possible implementations, when the terminal receives the handover command, the first link failure report further includes at least one of a time interval between the moment at which the handover command is received and the moment at which the link between the terminal and the first radio access network device fails and a time interval between the moment at which the handover command is received and the moment at which the terminal is handed over from the third radio access network device to the second radio access network device.

The first link failure report is sent to the first radio access network device, and the first radio access network device may more accurately perform the parameter adjustment based on the specific content of the first link failure report, to further improve the communication efficiency in the dual connectivity scenario.

In some possible implementations, the method further includes: The terminal receives a first link failure report request from the second radio access network device. That a terminal sends a first link failure report to a second radio access network device includes: The terminal sends the first link failure report to the second radio access network device based on the first link failure report request.

The terminal may send the first link failure report to the second radio access network device only when the second radio access network device requests the first link failure report. This avoids a resource waste caused by sending the first link failure report when the first link failure report is not required.

In some possible implementations, that a terminal sends a first link failure report to a second radio access network device includes: The terminal sends the first link failure report to the second radio access network device based on a preset reporting condition.

The terminal may automatically report the first link failure report based on the preset reporting condition, to further reduce the resource waste.

In some possible implementations, the method further includes: The terminal receives a second link failure report request from the second radio access network device. That the terminal sends a second link failure report to the second radio access network device includes: The terminal sends the second link failure report to the second radio access network device based on the second link failure report request.

The terminal may send the second link failure report to the second radio access network device only when the second radio access network device requests the second link failure report. This avoids a resource waste caused by sending the second link failure report when the second link failure report is not required.

In some possible implementations, that the terminal sends a second link failure report to the second radio access network device includes: The terminal sends the second link failure report to the second radio access network device based on the preset reporting condition.

The terminal may automatically report the second link failure report based on the preset reporting condition, to further reduce the resource waste.

According to a second aspect, a link failure report transmission method is provided. The method includes: A second radio access network device receives a first link failure report from a terminal, where the first link failure report is used to indicate that a link between the terminal and a first radio access network device fails, and the first radio access network device is a secondary access network device of a third radio access network device; and the second radio access network device sends the first link failure report to the third radio access network device.

The second radio access network device receives the first link failure report from the terminal, and forwards the first link failure report to the third radio access network device, so that the third radio access network device sends the first link failure report to the first radio access network device. In this way, the first radio access network device may perform parameter adjustment based on the first link failure report, to improve communication efficiency in a dual connectivity scenario.

In some possible implementations, the method further includes: The second radio access network device receives a second link failure report from the terminal, where the second link failure report is used to indicate that a link between the terminal and a fourth radio access network device fails.

The second radio access network device may further receive the second link failure report from the terminal, and send the second radio access network device to the third radio access network device, so that the third radio access network device adjusts a handover parameter, and a more appropriate radio access network device can be selected as a target radio access network device to be handed over.

In some possible implementations, a first message includes the first link failure report and the second link failure report.

The terminal may send the first link failure report and the second link failure report to the second radio access network device by using one message, where the first link failure report and the second link failure report are respectively used as different sub-elements in the message. Therefore, resource overheads are reduced.

In some possible implementations, the second link failure report includes: cell information of a first cell, where the first cell is within coverage of the fourth radio access network device, and a link failure occurs between the terminal and the first cell; a type of the link failure that occurs in the first cell; cell information of a primary cell of a cell in which a connection failure occurs or cell information of a cell in which a handover command is received for the last time; cell information of a cell that is served by a radio access network device and in which the terminal successfully reestablishes a connection; a time interval between a moment at which the link between the terminal and the first radio access network device fails and a moment at which the link between the terminal and the fourth radio access network device fails; a time interval between the moment at which the link between the terminal and the fourth radio access network device fails and a moment at which a link between the terminal and the second radio access network device is successfully established; a time interval between a moment at which the handover command is received and the moment at which the link between the terminal and the fourth radio access network device fails; an identifier of the terminal; and a result of measurement between a neighboring cell of the first cell and the terminal.

The third radio access network device may adjust the handover parameter based on specific content of the second link failure report, and a more appropriate radio access network device can be selected as the target radio access network device to be handed over, thereby further improving the communication efficiency.

In some possible implementations, the first link failure report includes at least one of the following: cell information of a second cell, where the second cell is within coverage of the first radio access network device, and a link failure occurs between the terminal and the second cell; a type of the link failure that occurs in the second cell; cell information of a cell covered by a master access network device corresponding to the second cell; a time interval between the moment at which the link between the terminal and the first radio access network device fails and a moment at which the terminal is handed over from the third radio access network device to the second radio access network device; the identifier of the terminal; location information of the terminal; a result of measurement between the terminal and each primary cell in a master cell group; and a result of measurement between the terminal and each secondary cell in a secondary cell group.

The first link failure report is sent to the first radio access network device, and the first radio access network device may more accurately perform the parameter adjustment based on specific content of the first link failure report, to further improve the communication efficiency in the dual connectivity scenario.

In some possible implementations, when the terminal receives the handover command, the first link failure report further includes at least one of a time interval between the moment at which the handover command is received and the moment at which the link between the terminal and the first radio access network device fails and a time interval between the moment at which the handover command is received and the moment at which the terminal is handed over from the third radio access network device to the second radio access network device.

The first link failure report is sent to the first radio access network device, and the first radio access network device may more accurately perform the parameter adjustment based on the specific content of the first link failure report, to further improve the communication efficiency in the dual connectivity scenario.

According to a third aspect, a link failure report transmission method is provided. The method includes: A third radio access network device receives a first link failure report from a second radio access network device, where the first link failure report is used to indicate that a link between a terminal and a first radio access network device fails, and the first radio access network device is a secondary access network device of the third radio access network device; and the third radio access network device sends the link failure report to the first radio access network device.

The third radio access network device receives the first link failure report from the second radio access network device, and sends the first link failure report to the first radio access network device, so that the first radio access network device can perform parameter adjustment based on the first link failure report, to improve communication efficiency in a dual connectivity scenario.

In some possible implementations, before the third radio access network device receives the link failure report from the second radio access network device, the method further includes: The third radio access network device sends a handover command to the terminal, where the handover command is used to indicate the terminal to be handed over from the third radio access network device to the second radio access network device.

The third radio access network device may actively perform a radio access network device handover, and send the handover command to the terminal, so that the terminal performs a link switchover according to the handover command, to improve the communication efficiency.

In some possible implementations, the method further includes: The third radio access network device receives a second link failure report from the terminal when the terminal reestablishes a connection to the third radio access network device, where the second link failure report is used to indicate that a link between the terminal and the second radio access network device fails.

When the terminal reestablishes the connection to the third radio access network device, the third radio access network device receives the second link failure report from the terminal. In this way, the third radio access network device adjusts a handover parameter, and a more appropriate radio access network device can be selected as a target radio access network device to be handed over.

In some possible implementations, that the third radio access network device receives a second link failure report from the terminal includes: The third radio access network device receives a first message to the terminal, where the first message includes the first link failure report and the second link failure report.

The terminal may send the first link failure report and the second link failure report to the second radio access network device by using one message, where the first link failure report and the second link failure report are respectively used as different sub-elements in the message. Therefore, resource overheads are reduced.

In some possible implementations, the second link failure report includes: cell information of a first cell, where the first cell is within coverage of a fourth radio access network device, and a link failure occurs between the terminal and the first cell; a type of the link failure that occurs in the first cell; cell information of a primary cell of a cell in which a connection failure occurs or cell information of a cell in which the handover command is received for the last time; cell information of a cell that is served by a radio access network device and in which the terminal successfully reestablishes a connection; a time interval between a moment at which the link between the terminal and the first radio access network device fails and a moment at which a link between the terminal and the fourth radio access network device fails; a time interval between the moment at which the link between the terminal and the fourth radio access network device fails and a moment at which the link between the terminal and the second radio access network device is successfully established; a time interval between a moment at which the handover command is received and the moment at which the link between the terminal and the fourth radio access network device fails; an identifier of the terminal; and a result of measurement between a neighboring cell of the first cell and the terminal.

The third radio access network device may adjust the handover parameter based on specific content of the second link failure report, and a more appropriate radio access network device can be selected as the target radio access network device to be handed over, thereby further improving the communication efficiency.

In some possible implementations, the first link failure report includes at least one of the following: cell information of a second cell, where the second cell is within coverage of the first radio access network device, and a link failure occurs between the terminal and the second cell; a type of the link failure that occurs in the second cell; cell information of a cell covered by a master access network device corresponding to the second cell; a time interval between the moment at which the link between the terminal and the first radio access network device fails and a moment at which the terminal is handed over from the third radio access network device to the second radio access network device; the identifier of the terminal; location information of the terminal; a result of measurement between the terminal and each primary cell in a master cell group; and a result of measurement between the terminal and each secondary cell in a secondary cell group.

The first link failure report is sent to the first radio access network device, and the first radio access network device may more accurately perform the parameter adjustment based on specific content of the first link failure report, to further improve the communication efficiency in the dual connectivity scenario.

In some possible implementations, when the third radio access network device sends the handover command to the terminal, and the terminal receives the handover command, the first link failure report further includes at least one of a time interval between the moment at which the handover command is received and the moment at which the link between the terminal and the first radio access network device fails and a time interval between the moment at which the handover command is received and the moment at which the terminal is handed over from the third radio access network device to the second radio access network device.

The first link failure report is sent to the first radio access network device, and the first radio access network device may more accurately perform the parameter adjustment based on the specific content of the first link failure report, to further improve the communication efficiency in the dual connectivity scenario.

According to a fourth aspect, a link failure report transmission apparatus is provided. The apparatus may be a terminal, or may be a chip in the terminal. The apparatus has a function of implementing the first aspect and various possible implementations of the first aspect. The function may be implemented by hardware, or may be implemented by hardware executing corresponding software. The hardware or the software includes one or more modules corresponding to the function.

In a possible design, the apparatus includes a sending module. Optionally, the apparatus further includes a processing module. The sending module may be, for example, at least one of a transceiver, a receiver, or a transmitter. The sending module may include a radio frequency circuit or an antenna. The processing module may be a processor. Optionally, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another module, to enable the apparatus to perform the communication method according to any one of the first aspect and various possible implementations of the first aspect. In this design, the apparatus may be a terminal.

In another possible design, when the apparatus is a chip, the chip includes a sending module. Optionally, the apparatus further includes a processing module. The sending module may be, for example, an input/output interface, a pin, or a circuit on the chip. The processing module may be, for example, a processor. The processing module may execute instructions, to enable the chip in the terminal to perform the communication method according to any one of the first aspect and the possible implementations of the first aspect. Optionally, the processing module may execute instructions in a storage module, and the storage module may be a storage module in the chip, for example, a register or a buffer. The storage module may alternatively be located inside a communication device but outside the chip, for example, a read-only memory (ROM) or another type of static storage device that can store static information and instructions, or a random access memory (RAM).

The processor mentioned above may be a general-purpose central processing unit (CPU), a microprocessor, an application-specific integrated circuit (ASIC), or one or more integrated circuits configured to control program execution of the communication methods according to the foregoing aspects.

According to a fifth aspect, a link failure report transmission apparatus is provided. The apparatus may be a second radio access network device, or may be a chip in the second radio access network device. The apparatus has a function of implementing the second aspect and various possible implementations of the second aspect. The function may be implemented by hardware, or may be implemented by hardware executing corresponding software. The hardware or the software includes one or more modules corresponding to the function.

In a possible design, the apparatus includes a sending module and a receiving module. The sending module may be, for example, at least one of a transceiver, a receiver, or a transmitter. The sending module may include a radio frequency circuit or an antenna. Optionally, the apparatus further includes a processing module, and the processing module may be a processor.

Optionally, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another module, to enable the apparatus to perform the method according to any one of the second aspect or the possible implementations of the second aspect.

In another possible design, when the apparatus is a chip, the chip includes a sending module and a processing module. The sending module may be, for example, an input/output interface, a pin, or a circuit on the chip. The processing module may be, for example, a processor. The processing module may execute instructions, to enable the chip in the radio access network device to perform the communication method according to any one of the second aspect and the possible implementations of the second aspect.

Optionally, the processing module may execute instructions in a storage module, and the storage module may be a storage module in the chip, for example, a register or a buffer. The storage module may alternatively be located inside a communication device but outside the chip, for example, a ROM or another type of static storage device that can store static information and instructions, or a RAM.

The processor mentioned above may be a CPU, a microprocessor, an application-specific integrated circuit ASIC, or one or more integrated circuits configured to control program execution of the communication methods according to the foregoing aspects.

According to a sixth aspect, a link failure report transmission apparatus is provided. The apparatus may be a third radio access network device, or may be a chip in the third radio access network device. The apparatus has a function of implementing the second aspect and various possible implementations of the second aspect. The function may be implemented by hardware, or may be implemented by hardware executing corresponding software. The hardware or the software includes one or more modules corresponding to the function.

In a possible design, the apparatus includes a receiving module and a sending module. Optionally, the apparatus further includes a processing module. The sending module or the receiving module may be, for example, at least one of a transceiver, a receiver, or a transmitter. The sending module or the receiving module may include a radio frequency circuit or an antenna. The processing module may be a processor.

Optionally, the apparatus further includes a storage module, and the storage module may be, for example, a memory. When the apparatus includes the storage module, the storage module is configured to store instructions. The processing module is connected to the storage module, and the processing module may execute the instructions stored in the storage module or instructions from another module, to enable the apparatus to perform the method according to any one of the second aspect or the possible implementations of the second aspect.

In another possible design, when the apparatus is a chip, the chip includes a receiving module and a sending module. Optionally, the apparatus further includes a processing module. The sending module or the receiving module may be, for example, an input/output interface, a pin, or a circuit on the chip. The processing module may be, for example, a processor. The processing module may execute instructions, to enable the chip in the radio access network device to perform the communication method according to any one of the second aspect and the possible implementations of the second aspect.

Optionally, the processing module may execute instructions in a storage module, and the storage module may be a storage module in the chip, for example, a register or a buffer. The storage module may alternatively be located inside a communication device but outside the chip, for example, a ROM or another type of static storage device that can store static information and instructions, or a RAM.

The processor mentioned above may be a CPU, a microprocessor, an application-specific integrated circuit ASIC, or one or more integrated circuits configured to control program execution of the communication methods according to the foregoing aspects.

According to a seventh aspect, a computer storage medium is provided. The computer storage medium stores program code, and the program code is used to indicate instructions for performing the method according to any one of the first aspect and the possible implementations of the first aspect.

According to an eighth aspect, a computer storage medium is provided. The computer storage medium stores program code, and the program code is used to indicate instructions for performing the method according to any one of the second aspect and the possible implementations of the second aspect.

According to a ninth aspect, a computer storage medium is provided. The computer storage medium stores program code, and the program code is used to indicate instructions for performing the method according to any one of the third aspect and the possible implementations of the third aspect.

According to a tenth aspect, a computer program product including instructions is provided. When the computer program product runs on a computer, the computer is enabled to perform the method according to any one of the first aspect or the possible implementations of the first aspect.

According to an eleventh aspect, a computer program product including instructions is provided. When the computer program product runs on a computer, the computer is enabled to perform the method according to any one of the second aspect or the possible implementations of the second aspect.

According to a twelfth aspect, a computer program product including instructions is provided. When the computer program product runs on a computer, the computer is enabled to perform the method according to any one of the third aspect or the possible implementations of the third aspect.

According to a thirteenth aspect, a computer program product including instructions is provided. When the computer program product runs on a computer, the computer is enabled to perform the method according to any one of the fourth aspect or the possible implementations of the fourth aspect.

According to a fourteenth aspect, a communication system is provided. The communication system includes the apparatus according to the fourth aspect, the apparatus according to the fifth aspect, and the apparatus according to the sixth aspect.

Based on the foregoing technical solutions, when the link between the terminal and the first radio access network device fails, and the master radio access network device of the first radio access network device is handed over, the terminal sends the first link failure report to the second radio access network device, so that the second radio access network device forwards the first link failure report to the third radio access network device, and the third radio access network device sends the first link failure report to the first radio access network device. In this way, the first radio access network device can perform the parameter adjustment based on the first link failure report. Therefore, the communication efficiency in the dual connectivity scenario is improved.

DETAILED DESCRIPTION OF ILLUSTRATIVE EMBODIMENTS

Figure 1:
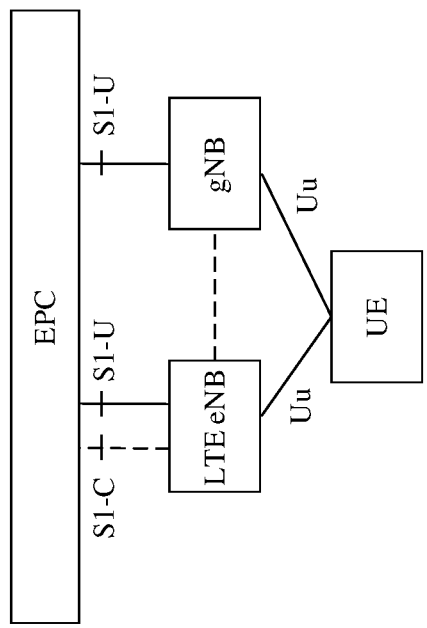
FIG. 1 is a schematic diagram of a system architecture according to an embodiment of this application.
Figure 1:
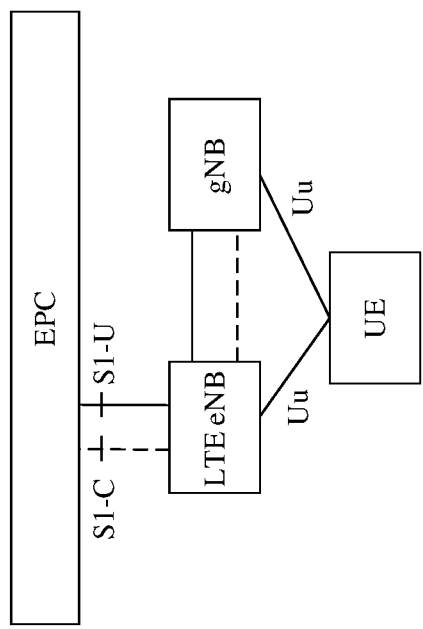

The following describes the technical solutions in this application with reference to the accompanying drawings.

The technical solutions in the embodiments of this application may be applied to various communication systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communication system, a future 5th generation (5G) system, or a new radio (NR) system.

A terminal device in the embodiments of this application may also be referred to as user equipment (UE), an access terminal device, a subscriber unit, a subscriber station, a mobile station, a mobile station, a remote station, a remote terminal device, a mobile device, a user terminal device, a terminal device, a wireless communication device, a user agent, a user apparatus, or the like. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A radio access network device in the embodiments of this application may be a device configured to communicate with the terminal device. The radio access network device may be a base transceiver station (BTS) in a global system for mobile communications (GSM) or code division multiple access (CDMA), may be a NodeB (NB) in a wideband code division multiple access (WCDMA) system, may be an evolved NodeB (eNB or eNodeB) in an LTE system, or may be a radio controller in a cloud radio access network (CRAN) scenario. Alternatively, the radio access network device may be a relay station, an access point, a vehicle-mounted device, a wearable device, a radio access network device in a future 5G network, a radio access network device in a future evolved PLMN network, or one or a group of antenna panels (including a plurality of antenna panels) of a base station in a 5G system, or may be a network node that constitutes a gNB or a transmission point, for example, a baseband unit (BBU) or a distributed unit (DU). This is not limited in the embodiments of this application.

In some deployments, the gNB may include a centralized unit (CU) and a DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some processing functions of the physical layer, radio frequency processing, and a function related to an active antenna. Information at the RRC layer eventually becomes information at the PHY layer, or is changed from information at the PHY layer. Therefore, in this architecture, higher layer signaling such as RRC layer signaling may also be considered as being sent by the DU or sent by the DU and the AAU. It may be understood that the radio access network device may be a device including one or more of a CU node, a DU node, and an AAU node. In addition, the CU may be classified as a radio access network device in an access network (RAN), or the CU may be classified as a radio access network device in a core network (CN). This is not limited in this application.

In the embodiments of this application, the terminal device or the radio access network device includes a hardware layer, an operating system layer running above the hardware layer, and an application layer running above the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of a method provided in the embodiments of this application is not specifically limited in the embodiments of this application provided that a program that records code for the method provided in the embodiments of this application can be run to perform communication according to the method provided in the embodiments of this application. For example, the execution body of the method provided in the embodiments of this application may be the terminal device, the radio access network device, or a functional module that is in the terminal device or the radio access network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable device, carrier or medium. For example, a computer-readable medium may include but is not limited to: a magnetic storage component (for example, a hard disk, a floppy disk, or a magnetic tape), an optical disc (for example, a compact disc (CD) and a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to radio channels and various other media that can store, include, and/or carry instructions and/or data.

The following describes terms related in this application.

1. Carrier Aggregation (CA)

A terminal may perform uplink and downlink communication by simultaneously using a plurality of cells, to support high-speed data transmission. One cell in the plurality of cells is a primary cell (PCell), and another cell is a secondary cell (SCell). In the CA, a physical downlink control channel (PDCCH) and a physical downlink shared channel (PDSCH) are allowed to be in a same carrier component (CC) or different CCs, that is, cross-carrier scheduling is allowed. The CC, a bandwidth part (BWP), the CC/the BWP, and the CC and/or the BWP may generally be equivalently replaced because they all refer to a segment of frequency domain resources. The CC can also be replaced with a cell. The BWP represents a segment of consecutive frequency domain resources. For example, the BWP may be understood as a segment of a continuous frequency band, the frequency band includes at least one continuous sub-band, and each bandwidth part may correspond to a group of numerologies. Different bandwidth parts may correspond to different system parameters.

2. Primary Cell (PCell)

The PCell is a cell on which a CA terminal camps, and the CA terminal corresponds to a physical uplink control channel (PUCCH) channel.

3. Secondary Cell (SCell)

The SCell is a cell configured for a CA terminal by using radio resource control (RRC) connection signaling, works on a secondary component carrier (SCC), and may provide more radio resources for the CA terminal device. In the SCell, there may be only downlink transmission or both uplink and downlink transmission.

4. Primary Secondary Cell (PSCell)

The PSCell is a special secondary cell that is served by a secondary base station and that is configured by a master base station for dual connectivity (DC) UE by using RRC connection signaling.

5. Multi-Connectivity (Multi-Radio Dual Connectivity, MR-DC)

Two base stations can simultaneously provide a data transmission service for one terminal, where the two base stations may be an EUTRAN base station and an NR base station, or two NR base stations. A base station serving a PCell is referred to as a master base station (master gNB, MgNB), and a base station serving another PSCell is referred to as a secondary base station (secondary gNB, SgNB). The master base station is a control plane anchor, that is, an RRC connection is established between the terminal and the master base station, a control plane connection is established between the master base station and a core network element, and an RRC message is transmitted between the master base station and the terminal. In a subsequent enhancement technology, some RRC messages (for example, measurement configuration information or a measurement report) may also be transmitted between the secondary base station and the terminal.

6. Master Cell Group (MCG)

In DC, a plurality of serving cells served by the master base station form the MCG. The MCG may specifically include one PCell and one or more SCells.

7. Secondary Cell Group (SCG)

A plurality of serving cells served by the secondary base station form the SCG. The MCG may specifically include one PSCell and one or more SCells.

8. Mobility Robust Optimization (MRO)

The MRO can be applied to optimization of a handover in an LTE system or a handover between the LTE system and another system. The MRO is used to reduce a quantity of radio link failures related to the handover between the LTE system and another system, thereby reducing an inter-system handover failure rate and a call drop rate, and improving inter-system handover performance and user experience. Specifically, monitoring, identification, and statistics collection are performed on the inter-system handover, and then it is determined to adjust a related inter-system handover parameter to change a difficulty degree of the inter-system handover. Therefore, abnormality of the inter-system handover can be minimized and deterioration of the inter-system handover performance can be reduced as much as possible.

9. S-MN Radio Link Failure (RLF)

A radio link failure occurs between a terminal and an S-MN. Because an MN is a master base station, the radio link failure may be referred to as an "MCG failure".

10. S-SN RLF

A radio link failure occurs between a terminal and an S-SN. Because an SN is a secondary base station, the radio link failure may be referred to as an "SCG failure".

11. SCG Failure Information (Failureinfo)

In NR, an architecture for multi-connection data transmission is supported. In a current multi-link data transmission process, when a radio link failure occurs between a terminal and a secondary base station, the terminal sends the SCG failureinfo to a master base station. The SCG failureinfo may be classified into LTE SCG failureinfo (that is, the secondary base station is an LTE base station) and NR SCG failureinfo (that is, the secondary base station is an NR base station). The LTE SCG failureinfo includes a failure type, measurement results that are of a primary cell and a neighboring cell and are obtained when a failure occurs, and the like. The NR SCG failureinfo includes a failure type and measurement results obtained when a failure occurs in an SCG. The measurement results include frequency information of a beam, and measurement results of a serving cell and a neighboring cell. The measurement results of the serving cell and the neighboring cell include a physical cell identifier (PCI), reference signal received power (RSRP)/reference signal received quality (RSRQ)/a signal to interference plus noise ratio (SINR) of a synchronization signal block (SSB)/a channel state information (CSI)-reference signal (RS), a SSB/CSI-RS group number index, and corresponding RSRP/RSRQ/a corresponding SINR.

FIG. 1 is a schematic diagram of a system architecture according to an embodiment of this application. The communication architecture may be referred to as (E-UTRA NR DC, EN-DC), or may be referred to as Option 3 series. In the communication architecture, an LTE base station serves as an MN, an NR base station serves as an SN, and DC is performed between the MN and the SN. In addition, both the MN and the SN are connected to an EPC, and can provide air interface transmission resources for data between UE and the EPC. That the MN and the SN are connected to an EPC may be that the MN and the SN are separately connected to the EPC. Alternatively, that the MN and the SN are connected to an EPC may be that the MN is connected to the EPC, and the SN is connected to the EPC through the MN. The MN may also be referred to as an "anchor".

It should be noted that the LTE base station in this application may be an eNB or an ng-eNB, and the NR base station may be a gNB.

Figure 2:
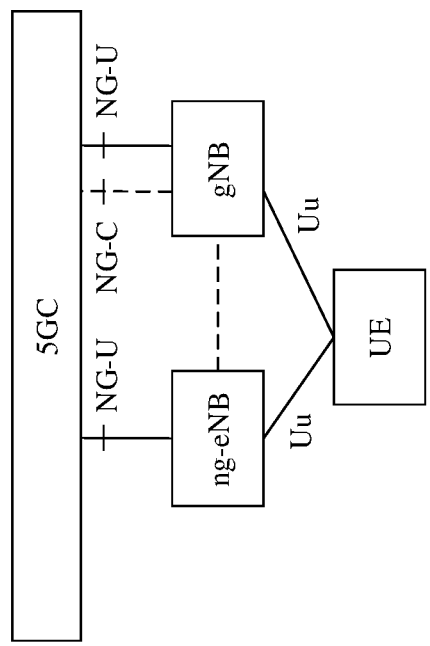
FIG. 2 is a schematic diagram of another system architecture according to an embodiment of this application.
Figure 2:
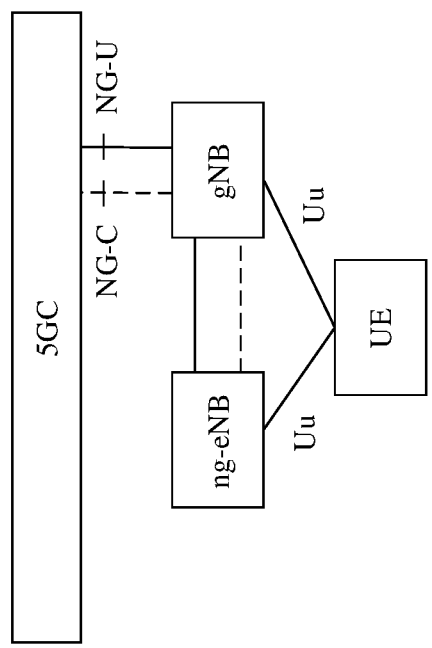

FIG. 2 is a schematic diagram of another system architecture according to an embodiment of this application. The communication architecture may be referred to as (NR E-UTRA DC, NE-DC), or may be referred to as Option 4 series. An NR base station serves as a master node, and an LTE base station serves as a secondary node. In addition, both the master node and the secondary node are connected to a 5GC, and can provide air interface transmission resources for data between UE and the 5GC. That the MN and the SN are connected to a 5GC may be that the MN and the SN are separately connected to the 5GC. Alternatively, that the MN and the SN are connected to a 5GC may be that the MN is connected to the 5GC, and the SN is connected to the 5GC through the MN.

Figure 3:
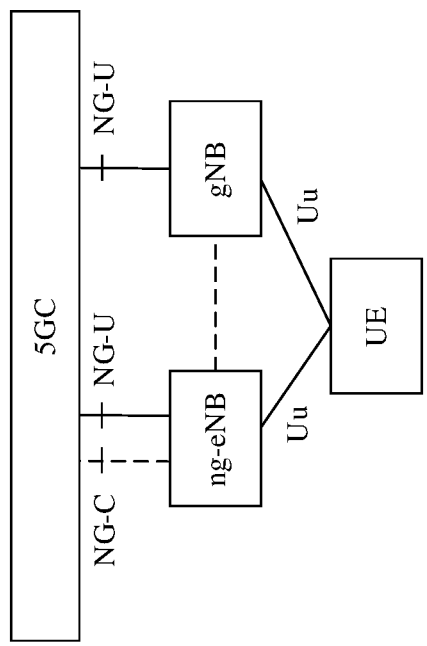
FIG. 3 is a schematic diagram of another system architecture according to an embodiment of this application.
Figure 3:
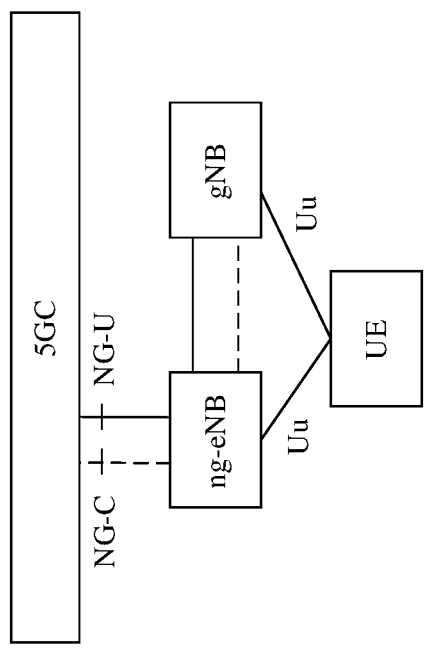

FIG. 3 is a schematic diagram of another system architecture according to an embodiment of this application. The communication architecture may be referred to as (next generation E-UTRA NR DC, NG EN-DC), or may be referred to as Option 7 series In the communication architecture, an LTE base station is a master node, an NR base station is a secondary node, and DC is performed between the master node and the secondary node. Both the MN and the SN are connected to a 5GC, and provide air interface transmission resources for data between UE and the 5GC. That the MN and the SN are connected to a 5GC may be that the MN and the SN are separately connected to the 5GC. Alternatively, that the MN and the SN are connected to a 5GC may be that the MN is connected to the 5GC, and the SN is connected to the 5GC through the MN.

It should be further noted that this application may be further applied to a communication system in which DC is performed between two NR base stations.

It should be understood that an interface between a terminal and the master base station or between the terminal and the secondary base station in the communication architecture in the embodiments of this application may be a "Uu" interface. An interface between a base station and an EPC may be an "S1-C" interface or an "S1-U" interface. An interface between a base station and a 5GC may be an "NG-C" interface or an "NG-U" interface.

It should be further understood that the terminal may be further used in an architecture in which the terminal simultaneously keeps communication connections to a plurality of base stations and can send and receive data. The architecture may be referred to as "multi-connectivity (MC)". One base station in the plurality of base stations may be configured to exchange a radio resource control message with the terminal and interact with a core network control plane entity. The base station may be referred to as the MN. Other base stations in the plurality of base stations may be referred to as the SNs.

In an MR-DC scenario, when a link between the terminal and the SN fails and the MN is handed over, an SCG failure report of the terminal cannot be sent to the SN. Consequently, the SN cannot perform parameter adjustment, resulting in low communication efficiency.

Figure 4:
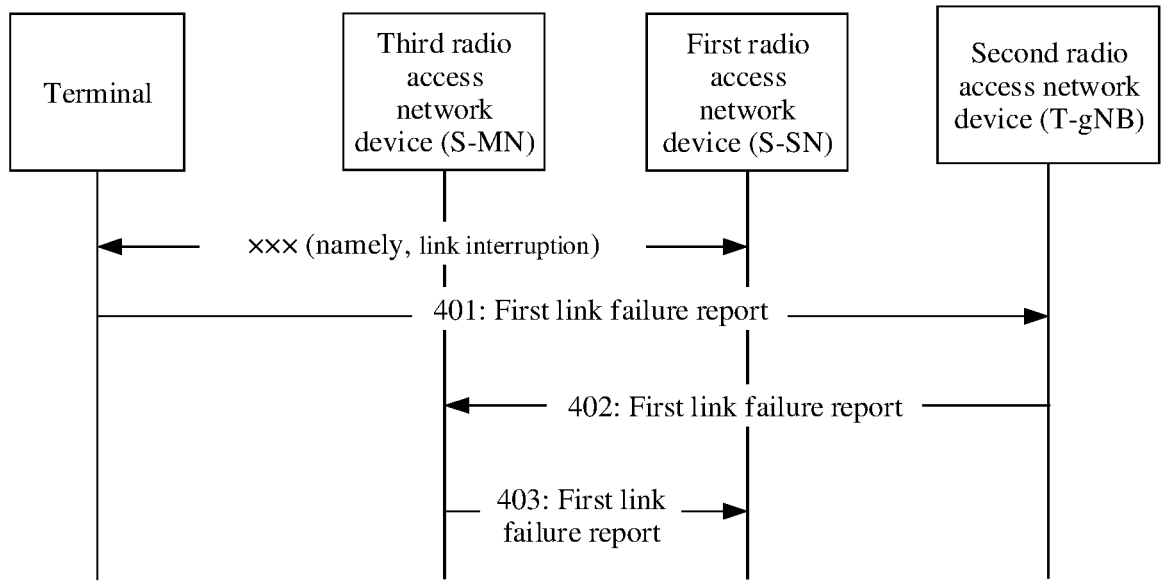
FIG. 4 is a schematic flowchart of a link failure report transmission method according to an embodiment of this application.

FIG. 4 is a schematic flowchart of a link failure report transmission method according to an embodiment of this application.

It should be noted that a first radio access network device in this embodiment of this application is a secondary access network device of a third radio access network device. In other words, the first radio access network device and the third radio access network device may form dual connectivity with a terminal. The first radio access network device is the secondary access network device, and the third radio access network device is a master access network device.

401: The terminal sends a first link failure report to a second radio access network device, where the first link failure report is used to indicate that a link between the terminal and the first radio access network device fails.

Specifically, the terminal can simultaneously communicate with the first radio access network device and the third radio access network device, that is, the terminal simultaneously keeps wireless connections to the first radio access network device and the third radio access network device. For example, the first radio access network device is a secondary base station, and the third radio access network device is a master base station. When the link between the terminal and the first radio access network device is faulty, the terminal may send the first link failure report (an SCG failure report) to the second radio access network device.

It should be noted that a link failure may be that a connected link is interrupted or faulty, or may be that an unconnected link is not successfully connected.

Optionally, the second radio access network device may serve as the master access network device, and a new secondary access network device is added to the terminal, or the first radio network device may be added as the secondary access network device of the master access network device.

In an embodiment, step 401 is specifically: The terminal sends the first link failure report to the second radio access network device when the terminal is successfully handed over from the third radio access network device to the second radio access network device.

Specifically, the third radio access network device triggers the handover of the terminal. For example, the third radio access network device sends a handover command to the terminal, where the handover command may indicate the terminal to be handed over from the third radio access network device to the second radio access network device. Before the terminal receives the handover command, if the link between the terminal and the first radio access network device is faulty, the terminal sends the first link failure report to the second radio access network device.

It should be noted that, that the terminal is handed over from the third radio access network device to the second radio access network device may be understood as that the terminal can simultaneously communicate with the first radio access network device and the second radio access network device, that is, the terminal simultaneously keeps wireless connections to the first radio access network device and the second radio access network device. For example, the first radio access network device is the secondary base station, and the second radio access network device is the master base station.

It should be understood that, because a time interval between a moment at which the link between the terminal and the first radio access network device is faulty and a moment at which the terminal receives the handover command is short, the terminal cannot report the first link failure report to the third radio access network device. Therefore, the terminal sends the first link failure report to the second radio access network device.

It should be understood that, in this embodiment, the first radio access network device may be a source secondary base station (source SN, S-SN), the second radio access network device may be a target base station (target gNB, T-gNB), and the third radio access network device may be a source master base station (source MN, S-MN).

In another embodiment, step 401 is specifically: The terminal sends the first link failure report to the second radio access network device when the terminal successfully reestablishes a connection to the second radio access network device.

Specifically, when the terminal does not receive a handover command and detects that a link between the terminal and the third radio access network device fails, the terminal reselects an access network device (namely, the second radio access network device), and establishes the connection to the second radio access network device. Before the terminal detects that the link between the terminal and the third radio access network device fails, if the link between the terminal and the first radio access network device is faulty, the terminal sends the first link failure report to the second radio access network device.

It should be noted that, that the terminal successfully reestablishes a connection to the second radio access network device may be understood as that the terminal can simultaneously communicate with the first radio access network device and the second radio access network device, that is, the terminal simultaneously keeps wireless connections to the first radio access network device and the second radio access network device. For example, the first radio access network device is the secondary base station, and the second radio access network device is the master base station.

It should be understood that, because a time interval between a moment at which the terminal detects that the link between the terminal and the third radio access network device fails and a moment at which the link between the terminal and the first radio access network device is faulty is short, the terminal cannot report the first link failure report to the third radio access network device. Therefore, the terminal sends the first link failure report to the second radio access network device. This scenario may be referred to as a "delayed handover" scenario.

It should be understood that, in this embodiment, the first radio access network device may be an S-SN, the second radio access network device may be a T-gNB, and the third radio access network device may be an S-MN.

In still another embodiment, step 401 may be specifically: The terminal sends the first link failure report to the second radio access network device when the terminal is successfully handed over from the third radio access network device to a fourth radio access network device and a link between the terminal and the fourth radio access network device fails within a preset time interval.

Specifically, the third radio access network device triggers the handover of the terminal. For example, the third radio access network device sends a handover command to the terminal, where the handover command may indicate the terminal to be handed over from the third radio access network device to the fourth radio access network device. The terminal is handed over from the third radio access network device to the fourth radio access network device according to the handover command, and the handover is successful, but the link between the terminal and the fourth radio access network device fails within a short time period (namely, the preset time interval). Then, the terminal reselects an access network device (namely, the second radio access network device), and establishes a connection to the second radio access network device. Before the terminal receives the handover command, if the link between the terminal and the first radio access network device is faulty, the terminal sends the first link failure report to the second radio access network device.

It should be noted that, that the terminal is successfully handed over from the third radio access network device to a fourth radio access network device may be understood as that the terminal can simultaneously communicate with the first radio access network device and the fourth radio access network device, that is, the terminal simultaneously keeps wireless connections to the first radio access network device and the fourth radio access network device. For example, the first radio access network device is a secondary base station, and the fourth radio access network device is a master base station. Then, when the link between the terminal and the fourth radio access network device fails, the terminal can simultaneously communicate with the first radio access network device and the second radio access network device, that is, the terminal simultaneously keeps wireless connections to the first radio access network device and the second radio access network device. For example, the first radio access network device is the secondary base station, and the second radio access network device is the master base station.

It should be understood that, because a time interval between a moment at which the link between the terminal and the first radio access network device is faulty and a moment at which the terminal receives the handover command is short, the terminal cannot report the first link failure report to the third radio access network. Therefore, the terminal sends the first link failure report to the second radio access network device. This scenario may be understood as reporting a link failure report for the secondary base station of the terminal when the terminal is handed over to an incorrect cell. This scenario may be understood as reporting a link failure report for the secondary base station of the terminal when the terminal is handed over to an incorrect cell.

It should be understood that, after the terminal is successfully handed over to the fourth radio access network device, if the terminal cannot timely send the first link failure report to the fourth radio access network device within the preset time interval, the link between the terminal and the fourth radio access network device fails.

It should be noted that if the terminal can send the first link failure report to the fourth radio access network device, a step similar to that of the first embodiment is performed, that is, the terminal is successfully handed over from the third access network device to the fourth radio access network device, and the terminal sends the first link failure report to the fourth radio access network device.

Optionally, in this embodiment of this application, the second radio access network device reselected by the terminal may be a new access network device, or may be an original access network device (namely, the third radio access network device), that is, the second radio access network device and the third radio access network device are a same radio access network device. To be specific, in this embodiment, the first radio access network device may be an S-SN, the fourth radio access network device may be a T-gNB, the third radio access network device may be an S-MN, and the second radio access network device may be an S-MN or a gNB, where the gNB is a new access network device.

It should be understood that if the second radio access network device and the third radio access network device are not the same radio access network device, this scenario may be referred to as a "handover to an incorrect cell". If the second radio access network device and the third radio access network device are the same radio access network device, this application scenario may be referred to as a "premature handover".

In still another embodiment, step 401 may be specifically: The terminal sends the first link failure report to the second radio access network device when the terminal fails to be handed over from the third radio access network device to a fourth radio access network device.

Specifically, the third radio access network device triggers the handover of the terminal, and sends a handover command to the terminal. The terminal is handed over from the third radio access network device to the fourth radio access network device according to the handover command. If the handover fails, the terminal reselects an access network device (namely, the second radio access network device), and establishes a connection to the second radio access network device. Before the terminal receives the handover command, if the link between the terminal and the first radio access network device is faulty, the terminal sends the first link failure report to the second radio access network device.

It should be understood that, because a time interval between a moment at which the link between the terminal and the first radio access network device is faulty and a moment at which the terminal receives the handover command is short, the terminal cannot report the first link failure report to the third radio access network. Therefore, the terminal sends the first link failure report to the second radio access network device. This scenario may be understood as reporting a link failure report for the secondary base station of the terminal when the terminal is handed over to an incorrect cell. This scenario may be understood as reporting a link failure report for the secondary base station of the terminal when the terminal is handed over to an incorrect cell.

Optionally, in this embodiment of this application, the second radio access network device reselected by the terminal may be a new access network device, or may be an original access network device (namely, the third radio access network device), that is, the second radio access network device and the third radio access network device are a same radio access network device. An application scenario of this embodiment may also be referred to as a "premature handover". To be specific, in this embodiment, the first radio access network device may be an S-SN, the fourth radio access network device may be a T-gNB, the third radio access network device may be an S-MN, and the second radio access network device may be an S-MN or a gNB, where the gNB is a new access network device.

Optionally, the first link failure report includes at least one of the following: cell information of a second cell, where the second cell is within coverage of the first radio access network device, and a link failure occurs between the terminal and the second cell; a type of the link failure that occurs in the second cell; cell information (previouscellId/ mastercellId) of a primary cell served by a master base station corresponding to a base station to which the second cell belongs; a time interval between the moment at which the link between the terminal and the first radio access network device fails and a moment at which the terminal is handed over from the third radio access network device to the second radio access network device; an identifier of the terminal; location information of the terminal; a result of measurement between the terminal and each primary cell in a master cell group; and a result of measurement between the terminal and each secondary cell in a secondary cell group.

Specifically, a failure of the link between the terminal and the first radio access network device may be a failure of the link between the terminal that is in one or more cells within the coverage of the first radio access network device and the first radio access network device. Therefore, the first link failure report may include cell information (failedcellId/ failedsecondarycellId) of a cell (where the second cell is used as an example for description), where the cell is within the coverage of the first radio access network device, and a link failure occurs between the terminal and the cell.

The first link failure report further includes the type (connectionfailuretype) of the link failure that occurs in the second cell, where the type of the link failure includes at least one of the following: T310 expiration, a radio access problem, exceeding a maximum quantity of radio link control (RLC) retransmissions, an SCG synchronization configuration failure, an SCG reconfiguration failure, a beam failure recovery (BFR) failure, and a signaling radio bearer (SRB) 3 security failure.

Figure 5:
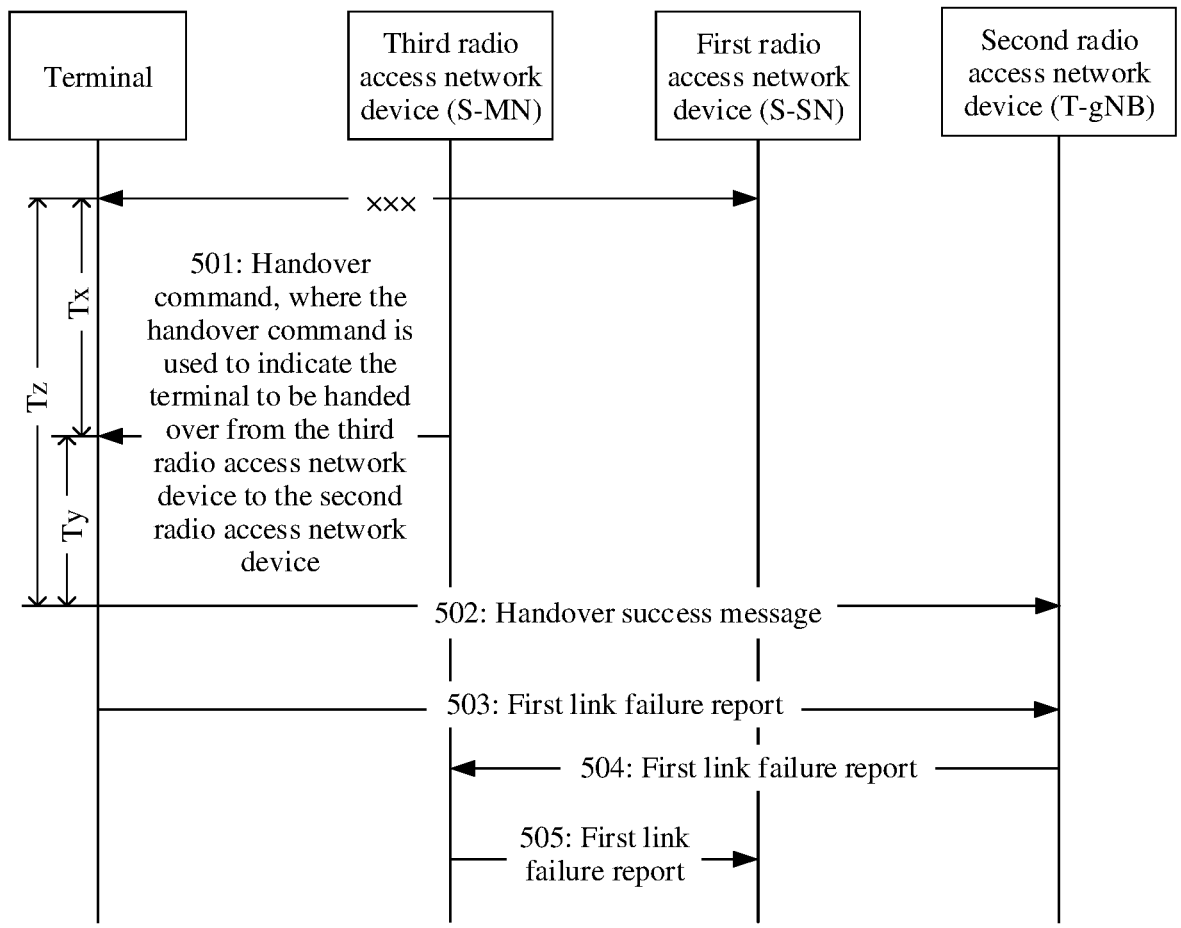
FIG. 5 is a schematic flowchart of a link failure report transmission method according to a specific embodiment of this application.
Figure 6:
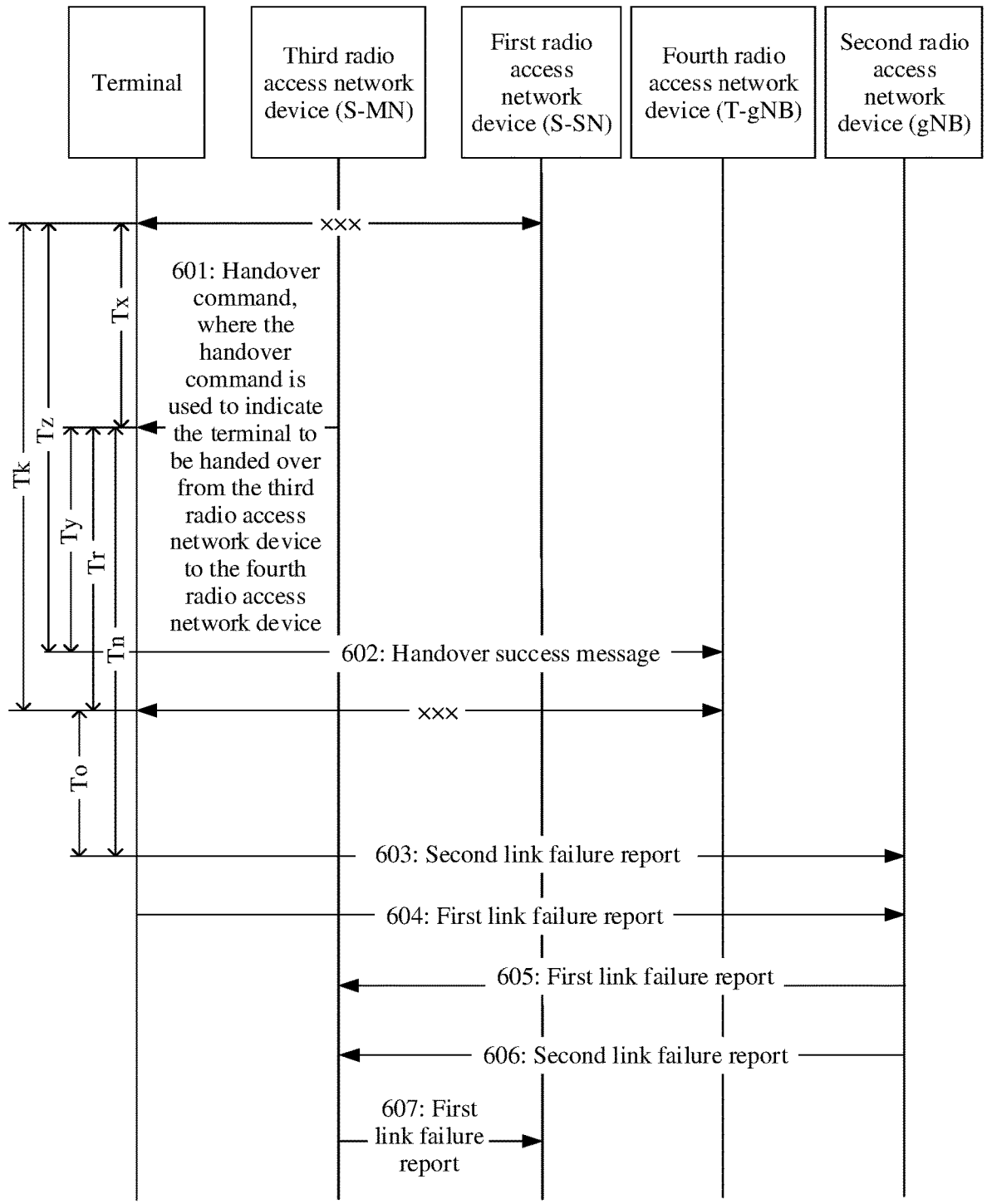
FIG. 6 is a schematic flowchart of a link failure report transmission method according to another embodiment of this application.

The time interval between the moment at which the link between the terminal and the first radio access network device fails and the moment at which the terminal is handed over from the third radio access network device to the second radio access network device (time since failure to HO CMP) is Tz shown in FIG. 5 or FIG. 6. The moment at which the terminal is handed over from the third radio access network device to the second radio access network device is specifically a moment at which the terminal sends a handover complete message to the second radio access network device, or may be a moment at which the terminal sends the first link failure report to the second radio access network device.

The identifier of the terminal may be a cell (C)-radio network temporary identifier (RNTI) of the terminal, or an Xn/X2 interface identifier (ID) of the terminal.

The location information (locationinfo) of the terminal may be a latitude and a longitude and/or a height of the terminal.

The result of the measurement between the terminal and each primary cell in the master cell group includes RSRP, RSRQ, an SINR, and the like of the cell. If an SCG is an NR cell, the result further supports beam measurement information, for example, an identifier (for example, an SSB-index and a CSI-RS-index) of a beam and RSRP, RSRQ, an SINR, and the like of the beam.

Optionally, the first link failure report may further include a time interval between the moment at which the link between the terminal and the first radio access network device fails and a moment at which the terminal successfully reestablishes a connection to a new radio access network device (time since SCG failure to reestab success), for example, in FIG. 6, a time interval between the moment at which the link between the terminal and the first radio access network device fails and a moment at which step 604 is performed.

Optionally, the first link failure report further includes one piece of indication information, where the indication information is used to indicate that an access network device to which a cell (the second cell) belongs is a secondary access network device, where a link failure occurs in the cell.

Optionally, when the terminal receives the handover command, the first link failure report further includes at least one of a time interval between a moment at which the handover command is received and the moment at which the link between the terminal and the first radio access network device fails and a time interval between the moment at which the handover command is received and the moment at which the terminal is handed over from the third radio access network device to the second radio access network device. The moment at which the terminal is handed over from the third radio access network device to the second radio access network device is specifically the moment at which the terminal sends the handover complete message to the second radio access network device, or may be the moment at which the terminal sends the first link failure report to the second radio access network device.

Specifically, the time interval between the moment at which the terminal detects that the link between the terminal and the first radio access network device fails and the moment at which the handover command is received (time since failure to HO CMD) may be Tx shown in FIG. 5 or FIG. 6, and the time interval between the moment at which the handover command is received and the moment at which the terminal is handed over from the third radio access network device to the second radio access network device (time since HO CMD to HO CMP) may be Ty shown in FIG. 5 or FIG. 6.

Optionally, when the terminal is successfully handed over from the third radio access network device to the fourth radio access network device and the link between the terminal and the fourth radio access network device fails within the preset time interval, or when the terminal fails to be handed over from the third radio access network device to the fourth radio access network device, the terminal may further send a second link failure report to the second radio access network device, where the second link failure report is used to indicate that the link between the terminal and the fourth radio access network device fails.

Specifically, the terminal is handed over from the third radio access network device to the fourth radio access network device according to the handover command sent by the third radio access network device. If the handover fails or a radio link fails within a short time period after the handover succeeds, the terminal may further send the second link failure report to the second radio access network device to which the connection is reestablished, so that the second radio access network device sends the second link failure report to the third radio access network device. In this way, the third radio access network device adjusts a handover parameter, and a more appropriate radio access network device can be selected as a target radio access network device to be handed over.

Optionally, in the scenario of the "handover to an incorrect cell", the second radio access network device may send the second link failure report to the fourth radio access network device, and then the fourth radio access network device sends the second link failure report to the third radio access network device. Alternatively, the second radio access network device only needs to send the second link failure report to the fourth radio access network device.

Optionally, the second link failure report includes: cell information of a first cell, where the first cell is within coverage of the fourth radio access network device, and a link failure occurs between the terminal and the first cell; a type of the link failure that occurs in the first cell; cell information of a primary cell of a cell in which a connection failure occurs or cell information of a cell in which the handover command is received for the last time; cell information of a cell in which the terminal reestablishes a connection; a time interval between the moment at which the link between the terminal and the first radio access network device fails and the moment at which the link between the terminal and the fourth radio access network device fails; a time interval between the moment at which the link between the terminal and the fourth radio access network device fails and a moment at which a link between the terminal and the second radio access network device is successfully established; a time interval between the moment at which the handover command is received and the moment at which the link between the terminal and the fourth radio access network device fails; the identifier of the terminal; and a result of measurement between a neighboring cell of the first cell and the terminal.

Specifically, if a link between the terminal that is in a cell (for example, the first cell) within the coverage of the fourth radio access network device and the fourth radio access network device fails, the second link failure report may include the cell information (failedcellId) of the first cell.

The type (connectionfailuretype) of the link failure that occurs in the first cell may be a link failure caused by a handover, or may be the same as the type of the link failure that occurs in the second cell. This is not limited in this application.

For the UE that does not receive the handover command, the cell information (previouscellId) of the primary cell of the cell in which the connection failure occurs is the cell information of the primary cell of the cell in which the connection failure occurs.

If the terminal fails to be handed over to the fourth radio access network device, or a link is interrupted after the terminal is handed over to the fourth radio access network device, the terminal reselects a radio access network device (namely, the second radio access network device). The second link failure report may include the cell information (reestablishmentCellId) of the cell that is served by the radio access network device and in which the terminal successfully reestablishes the connection.

Figure 7:
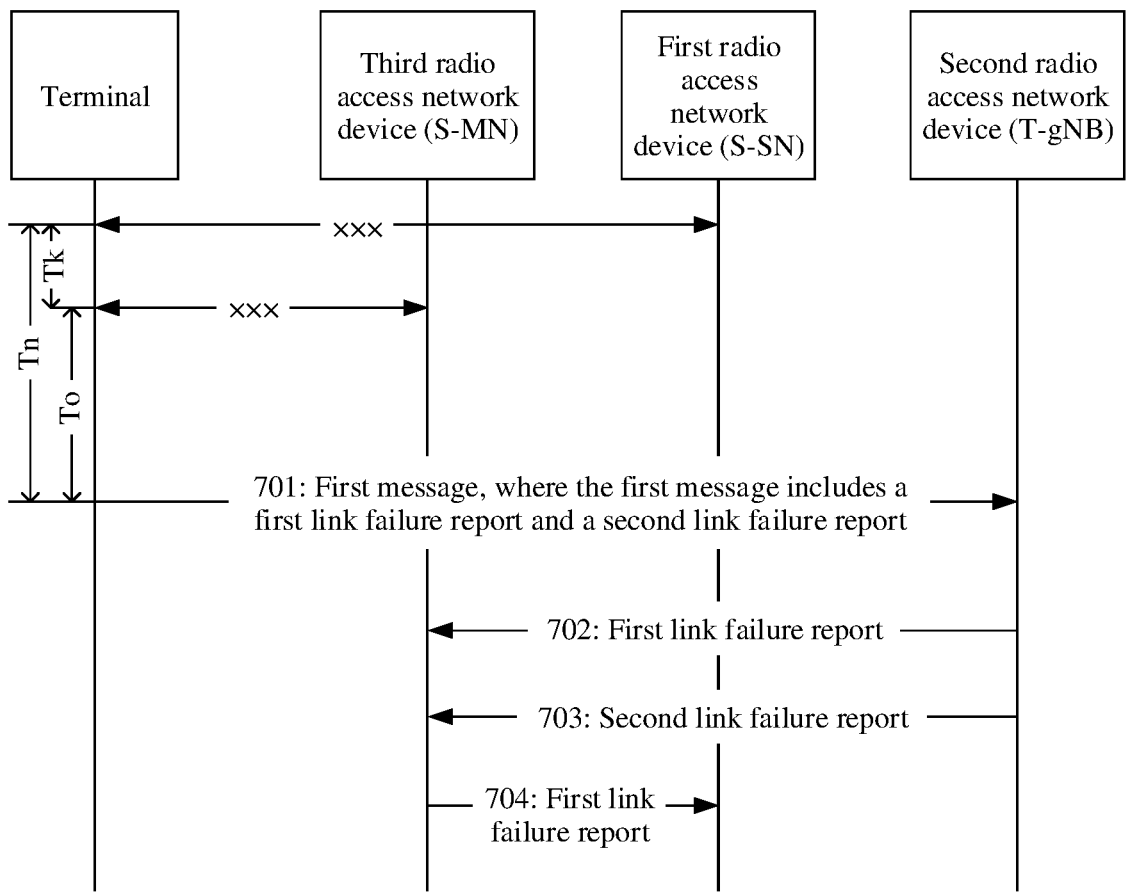
FIG. 7 is a schematic flowchart of a link failure report transmission method according to another embodiment of this application.

The second link failure report may include the time interval between the moment at which the terminal detects that the link between the terminal and the first radio access network device fails and the moment at which the terminal detects that the link between the terminal and the fourth radio access network device fails (time since SCG failure to RLF), for example, Tk shown in FIG. 6 or FIG. 7.

The second link failure report may further include the time interval between the moment at which the link between the terminal and the fourth radio access network device fails and the moment at which the link between the terminal and the second radio access network device is successfully established (time since RLF to reestab success), where the moment at which the link between the terminal and the second radio access network device is successfully established may be a moment at which the terminal sends the second link failure report to the second radio access network device. For example, the time interval is To shown in FIG. 6 or FIG. 7.

The second link failure report may further include the time interval between the moment at which the terminal receives the handover command and the moment at which the link between the terminal and the fourth radio access network device fails (time since HO CMD to RLF), for example, Tn shown in FIG. 6 or FIG. 7.

The neighboring cell of the first cell may be a cell within the coverage of the fourth radio access network device, or may be a cell within coverage of another wireless network. This is not limited in this application. The result of the measurement includes RSRP, RSRQ, SINRs, and the like of the cell and the neighboring cell. If both the first radio access network device and the second radio access network device are NR radio access network devices, the result of the measurement may further include beam measurement information, for example, an identifier of a beam, and RSRP, RSRQ, and an SINR of the beam.

In an embodiment, specifically, the second link failure report sent by the terminal to the second radio access network device and the first link failure report sent by the terminal to the second radio access network device may be separately sent.

In another embodiment, specifically, the second link failure report sent by the terminal to the second radio access network device and the first link failure report sent by the terminal to the second radio access network device may be sent in a combination manner.

Specifically, the terminal may combine information in the first link failure report and information in the second link failure report into a new report, thereby reducing resource overheads.

In still another embodiment, specifically, the second link failure report sent by the terminal to the second radio access network device and the first link failure report sent by the terminal to the second radio access network device may be carried in a same message for sending.

Specifically, the terminal may send the first link failure report and the second link failure report to the second radio access network device by using one message, where the first link failure report and the second link failure report are respectively used as different sub-elements in the message. Therefore, the resource overheads are reduced.

It should be noted that the second link failure report may further include an indication, to distinguish between the first link failure report and the second link failure report in a first message.

Optionally, that the terminal sends the first link failure report or the second link failure report to the second radio access network device may be specifically that the terminal actively sends the first link failure report or the second link failure report to the second radio access network device in a timely manner or periodically, or the terminal sends the first link failure report or the second link failure report after the terminal receives a link failure report request sent by the second radio access network device, or the terminal actively sends the first link failure report or the second link failure report to the second radio access network device based on a preset reporting condition.

Specifically, after the second radio access network device initiates the link failure report request to the terminal, the terminal reports the link failure report. For example, the second radio access network device executes a request by using an existing UEinformationrequest message, and the terminal makes a response by using an existing UEinformationresponse message, or the second radio access network device may execute the request and the terminal may make the response by using a new message. This is not limited in this application.

Alternatively, the terminal records and stores information about the link failure report. When the terminal satisfies the reporting condition or accesses a new radio access network device, the terminal may report the information about the link failure report to the second radio access network device. The reporting manner may be referred to as a minimize drive test (MDT) reporting manner.

It should be further noted that the first link failure report or the second link failure report may be reported by using an existing air interface message between the terminal and the second radio access network device, or may be reported by using a newly defined air interface message. This is not limited in this application.

It should be further noted that the terminal sends a report availability indication to a base station, where the report availability indication may be a first link failure report availability indication or a second link failure report availability indication. The wireless network access device determines availability of the link failure report according to the availability indication, to execute the request.

402: The second radio access network device sends the first link failure report to the third radio access network device.

Specifically, the second radio access network device may determine, based on the previouscellId in the first link failure report, to send the first link failure report to the third radio access network device.

It should be noted that the first link failure report may be sent by using a newly defined X2/Xn/S1/NG interface message (where S1 and NG interface messages are used when no X2 or Xn interface exists between two base stations) or an existing X2/Xn interface message. This is not limited in this application. The X2/Xn interface message includes one or more of the following information: an identifier of the S-MN, the previouscellId, an identifier of the S-SN, the failedcellID, and the C-RNTI.

Optionally, the X2/Xn/S1/NG interface message includes the C-RNTI, and the identifier of the S-SN and/or the failedcellID, which are used to indicate information about a master base station to which the first link failure report belongs. Therefore, the S-MN can send an SCG failure report to the S-SN, and the S-SN performs root cause analysis of the SCG failure.

Optionally, in the scenario of the "handover to an incorrect cell", the second radio access network device may send the first link failure report to the fourth radio access network device, and then the fourth radio access network device sends the first link failure report to the third radio access network device.

It should be noted that, when both the first link failure report and the second link failure report are carried in the same message, the second radio access network device may send the first message to the fourth radio access network device, and then the fourth radio access network device sends the first link failure report in the first message to the third radio access network device.

Optionally, the first link failure report may further include the location information of the terminal and/or the identifier of the terminal, to assist the third radio access network device in identifying the terminal.

Specifically, after the terminal is successfully handed over from the third radio access network device to the second radio access network device, the second radio access network device may send a release message to the third radio access network device, where the release message is used to indicate the third radio access network device to release context information of the terminal. Before receiving the first link failure report from the second radio access network device, if the third radio access network device has received the release message, the third radio access network device identifies the terminal based on the location information of the terminal and/or the identifier of the terminal.

It should be understood that the identifier of the terminal may be the C-RNTI, interface information (an X2/Xn AP ID), or the like.

403: The third radio access network device sends the first link failure report to the first radio access network device.

Specifically, when the third radio access network device receives the first link failure report from the second radio access network device, the third radio access network device may send the first link failure report to the first radio access network device, so that the first radio access network device can perform parameter adjustment based on the first link failure report, to improve communication efficiency in a dual connectivity scenario.

Optionally, the second radio access network device may directly send the first link failure report to the first radio access network device. In other words, step 402 and step 403 may not be performed in this application.

Specifically, if the second radio access network device serves as the master access network device, and the S-SN is added as the secondary base station, the second radio access network device may directly send the first link failure report to the first radio access network device.

Optionally, the X2/Xn/S1/NG interface message includes the C-RNTI, and the identifier of the S-MN and/or the previouscellId, which are used to indicate the information about the master base station to which the first link failure report belongs. Therefore, the S-SN can send the first link failure report to the S-MN, and the S-MN assists in performing root cause analysis of the link failure.

FIG. 5 is a schematic flowchart of a link failure report transmission method according to a specific embodiment of this application.

It should be noted that, unless otherwise specified, same terms in this embodiment of this application and the foregoing embodiments have a same meaning.

501: When detecting that a link between a terminal and a first radio access network device fails, the terminal receives a handover command from a third radio access network device, where the handover command is used to indicate the terminal to be handed over from the third radio access network device to a second radio access network device.

Specifically, the terminal first needs to be handed over from the third radio access network device to the second radio access network device according to the handover command.

502: The terminal may send a handover success message to the second radio access network device, where the handover success message is used to indicate that the terminal has been handed over from the third radio access network device to the second radio access network device.

503: The terminal sends a first link failure report to the second radio access network device, where the first link failure report is used to indicate that the link between the terminal and the first radio access network device fails.

504: The second radio access network device sends the first link failure report to the third radio access network device.

505: The third radio access network device sends the first link failure report to the first radio access network device, so that the first radio access network device can perform parameter adjustment based on the first link failure report.

Optionally, this application may also be applied to a scenario in which the terminal is handed over from the third radio access network device to a fourth radio access network device, but the handover fails, and then the terminal reselects a new radio access network device (for example, the second radio access network device), and further sends the first link failure report to the second radio access network device.

Optionally, this application may also be applied to a scenario in which the terminal is handed over from the third radio access network device to a fourth radio access network device, but the handover fails, and then the terminal reselects a new radio access network device, where the new radio access network device reselected by the terminal may be the third radio access network device.

FIG. 6 is a schematic flowchart of a link failure report transmission method according to another embodiment of this application.

It should be noted that, unless otherwise specified, same terms in this embodiment of this application and the foregoing embodiments have a same meaning.

601: A terminal receives a handover command from a third radio access network device, where the handover command is used to indicate the terminal to be handed over from the third radio access network device to a fourth radio access network device.

602: The terminal sends a handover success message to the fourth radio access network device, where the handover success message is used to indicate that the terminal has been handed over from the third radio access network device to the fourth radio access network device.

603: If the terminal detects that a link between the terminal and the fourth radio access network device fails within a preset time interval after the terminal is handed over from the third radio access network device to the fourth radio access network device, the terminal sends a second link failure report to a second radio access network device.

It should be noted that, the terminal may separately send a first link failure report and the second link failure; or may send a first link failure report and the second link failure report by using a same message, where the first link failure report and the second link failure report are respectively used as a sub-element and carried in the same message; or may combine a first link failure report and the second link failure report into a new link failure report for sending.

It should be further noted that the second radio access network device may be an access network device reselected by the terminal.

Optionally, if the terminal fails to be handed over from the third radio access network device to the fourth radio access network device, step 602 and step 603 are not performed. After step 601 is performed, step 604 is directly performed, and the terminal sends the second link failure report to the second radio access network device.

604: When detecting that a link between the terminal and a first radio access network device fails, the terminal sends the first link failure report to the second radio access network device, where the first link failure report is used to indicate that the link between the terminal and the first radio access network device fails.

605: The second radio access network device sends the first link failure report to the third radio access network device.

606: The second radio access network device sends the second link failure report to the third radio access network device.

It should be noted that the second radio access network device may forward the first link failure report and the second link failure report to the third radio access network device based on a manner of reporting the first link failure report and the second link failure report that are received from the terminal.

607: The third radio access network device sends the first link failure report to the first radio access network device.

Optionally, the second radio access network device and the third radio access network device may be a same radio access network device.

Optionally, this application may also be applied to a scenario in which the terminal is handed over from the third radio access network device to the fourth radio access network device, but the handover fails within a preset time interval, and the terminal reselects a new radio access network device, where the new radio access network device reselected by the terminal may be the third radio access network device.

FIG. 7 is a schematic flowchart of a link failure report transmission method according to another embodiment of this application.

It should be noted that, unless otherwise specified, same terms in this embodiment of this application and the foregoing embodiments have a same meaning.

701: When detecting that a link between a terminal and a first radio access network device fails and a link between the terminal and a third radio access network device fails, the terminal sends a first message to a second radio access network device, where the first message includes a first link failure report and a second link failure report.

Specifically, when detecting that the link between the terminal and the first radio access network device fails and the link between the terminal and the third radio access network device fails, the terminal reselects an access network device (namely, the second radio access network device), establishes a connection to the second radio access network device, and then sends the first link failure report and the second link failure report to the second radio access network device.

It should be noted that, the terminal may separately send the first link failure report and the second link failure; or may send the first link failure report and the second link failure report by using a same message, where the first link failure report and the second link failure report are respectively used as a sub-element and carried in the same message; or may combine the first link failure report and the second link failure report into a new link failure report for sending.

702: The second radio access network device sends the first link failure report to the third radio access network device.

703: The second radio access network device sends the second link failure report to the third radio access network device.

It should be noted that the second radio access network device may forward the first link failure report and the second link failure report to the third radio access network device based on a manner of reporting the first link failure report and the second link failure report that are received from the terminal. For example, the second radio access network device separately sends the first link failure report and the second link failure report, or may simultaneously send the first link failure report and the second link failure report by using one message. This is not limited in this application.

704: The third radio access network device sends the first link failure report to the first radio access network device.

The embodiments described in this specification may be independent solutions, or may be combined based on internal logic. These solutions all fall within the protection scope of this application.

It may be understood that, in the foregoing method embodiments, the methods and operations that are implemented by the terminal may alternatively be implemented by a component (for example, a chip or a circuit) that may be used in the terminal, and the methods and the operations that are implemented by the access network device may alternatively be implemented by a component (for example, a chip or a circuit) that may be used in the access network device.

The foregoing mainly describes the solutions provided in the embodiments of this application from the perspective of interaction. It may be understood that, to implement the foregoing functions, each network element, such as a transmit end device or a receive end device, includes a corresponding hardware structure and/or software module for performing each function. A person skilled in the art may be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the transmit end device or the receive end device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example, and is merely a logical function division. In an actual implementation, another division manner may be used. An example in which each functional module is obtained through division based on each corresponding function is used below for description.

It should be understood that specific examples in the embodiments of this application are merely intended to help a person skilled in the art better understand the embodiments of this application, but are not intended to limit the scope of the embodiments of this application.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The methods provided in the embodiments of this application are described above in detail with reference to FIG. 4 to FIG. 7. Apparatuses provided in the embodiments of this application are described below in detail with reference to FIG. 8 to FIG. 17. It should be understood that descriptions of the apparatus embodiments correspond to the descriptions of the method embodiments. Therefore, for content that is not described in detail, refer to the foregoing method embodiments. For brevity, details are not described herein again.

Figure 8:
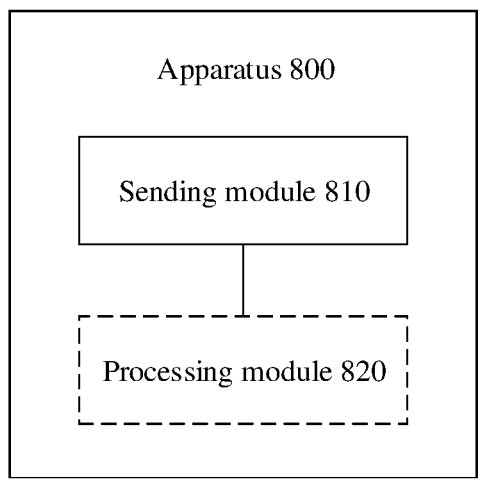
FIG. 8 is a schematic block diagram of a link failure report transmission apparatus according to an embodiment of this application.

FIG. 8 is a schematic block diagram of a link failure report transmission apparatus 800 according to an embodiment of this application.

It should be understood that the apparatus 800 may correspond to the terminal in the embodiments shown in FIG. 4 to FIG. 7, and may have any function of the terminal in the methods. The apparatus 800 includes a sending module 810 and a processing module 820.

The sending module 810 is configured to send a first link failure report to a second radio access network device, where the first link failure report is used to indicate that a link between the terminal and a first radio access network device fails, and the first radio access network device is a secondary radio access network device of a third radio access network device.

Optionally, the processing module 820 is configured to determine that the link between the terminal and the first radio access network device fails.

Optionally, the sending module 810 is specifically configured to send the first link failure report to the second radio access network device when the terminal is successfully handed over from the third radio access network device to the second radio access network device.

Optionally, the sending module 810 is specifically configured to send the first link failure report to the second radio access network device when the terminal successfully reestablishes a connection to the second radio access network device.

Optionally, the sending module 810 is specifically configured to send the first link failure report to the second radio access network device when the terminal is successfully handed over from the third radio access network device to a fourth radio access network device and a link between the terminal and the fourth radio access network device fails within a preset time interval.

Optionally, the sending module 810 is specifically configured to send the first link failure report to the second radio access network device when the terminal fails to be handed over from the third radio access network device to a fourth radio access network device.

Optionally, the second radio access network device and the third radio access network device are a same access network device.

Optionally, the sending module 810 is further configured to send a second link failure report to the second radio access network device, where the second link failure report is used to indicate that the link between the terminal and the fourth radio access network device fails.

Optionally, the sending module 810 is specifically configured to send a first message to the second radio access network device, where the first message includes the first link failure report and the second link failure report.

Optionally, the second link failure report includes: cell information of a first cell, where the first cell is within coverage of the fourth radio access network device, and a link failure occurs between the terminal and the first cell; a type of the link failure that occurs in the first cell; cell information of a primary cell of a cell in which a connection failure occurs or cell information of a cell in which a handover command is received for the last time; cell information of a cell that is served by a radio access network device and in which the terminal successfully reestablishes a connection; a time interval between a moment at which the link between the terminal and the first radio access network device fails and a moment at which the link between the terminal and the fourth radio access network device fails; a time interval between the moment at which the link between the terminal and the fourth radio access network device fails and a moment at which a link between the terminal and the second radio access network device is successfully established; a time interval between a moment at which the handover command is received and the moment at which the link between the terminal and the fourth radio access network device fails; an identifier of the terminal; and a result of measurement between a neighboring cell of the first cell and the terminal.

Optionally, the first link failure report includes at least one of the following: cell information of a second cell, where the second cell is within coverage of the first radio access network device, and a link failure occurs between the terminal and the second cell; a type of the link failure that occurs in the second cell; cell information of a cell covered by a master access network device corresponding to the second cell; a time interval between the moment at which the link between the terminal and the first radio access network device fails and a moment at which the terminal is handed over from the third radio access network device to the second radio access network device; the identifier of the terminal; location information of the terminal; a result of measurement between the terminal and each primary cell in a master cell group; and a result of measurement between the terminal and each secondary cell in a secondary cell group.

Optionally, when the terminal receives the handover command, the first link failure report further includes at least one of a time interval between the moment at which the handover command is received and the moment at which the link between the terminal and the first radio access network device fails and a time interval between the moment at which the handover command is received and the moment at which the terminal is handed over from the third radio access network device to the second radio access network device.

Figure 9:
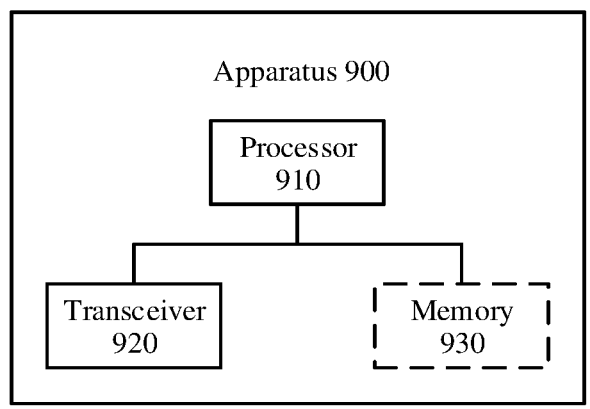
FIG. 9 is a schematic block diagram of a link failure report transmission apparatus according to an embodiment of this application.

FIG. 9 is a schematic block diagram of a link failure report transmission apparatus 900 according to an embodiment of this application. The apparatus 900 may be the terminal shown in FIG. 3. The apparatus may use a hardware architecture shown in FIG. 9. The apparatus may include a transceiver 920. Optionally, the apparatus may further include a processor 910. The transceiver may include a transmitter and/or a receiver. Optionally, the apparatus may further include a memory 930. The processor 910, the transceiver 920, and the memory 930 communicate with each other through an internal connection path. A related function implemented by the processing module 820 in FIG. 8 may be implemented by the processor 910, and a related function implemented by the sending module 810 may be implemented by the processor 910 by controlling the transceiver 920.

Optionally, the processor 910 may be a CPU, a microprocessor, an ASIC, a special-purpose processor, or one or more integrated circuits configured to perform the technical solutions in the embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control the link failure report transmission apparatus (for example, a base station, a terminal, or a chip), execute a software program, and process data of the software program.

Optionally, the processor 910 may include one or more processors, for example, include one or more CPUs. When the processor is one CPU, the CPU may be a single-core CPU or a multi-core CPU.

The transceiver 920 is configured to: send and receive data and/or a signal, and receive data and/or a signal. The transceiver may include a transmitter and a receiver. The transmitter is configured to send data and/or a signal, and the receiver is configured to receive data and/or a signal.

The memory 930 includes but is not limited to a random access memory (RAM), a read-only memory (ROM), an erasable programmable memory (EPROM), and a compact disc read-only memory (CD-ROM). The memory 930 is configured to store related instructions and related data.

The memory 930 is configured to store program code and data of the terminal, and may be a separate device or integrated into the processor 910.

Specifically, the processor 910 is configured to control the transceiver to perform information transmission with the terminal. For details, refer to the descriptions in the foregoing method embodiments. Details are not described herein again.

During specific implementation, in an embodiment, the apparatus 900 may further include an output device and an input device. The output device communicates with the processor 910, and may display information in a plurality of manners. For example, the output device may be a liquid crystal display (LCD), a light emitting diode (LED) display device, a cathode ray tube (CRT) display device, a projector, or the like. When communicating with the processor 910, the input device may receive an input from a user in a plurality of manners. For example, the input device may be a mouse, a keyboard, a touchscreen device, or a sensor device.

It may be understood that FIG. 9 shows only a simplified design of a link failure report transmission apparatus. During actual application, the apparatus may further include other necessary components, including but not limited to any quantity of transceivers, processors, controllers, memories, and the like, and all terminals that can implement this application shall fall within the protection scope of this application.

In a possible design, the apparatus 900 may be a chip, for example, may be a communication chip that may be used in the terminal, and configured to implement a related function of the processor 910 in the terminal. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a terminal or a circuit. The apparatus may be configured to perform an action performed by the terminal in the foregoing method embodiments.

Figure 10:
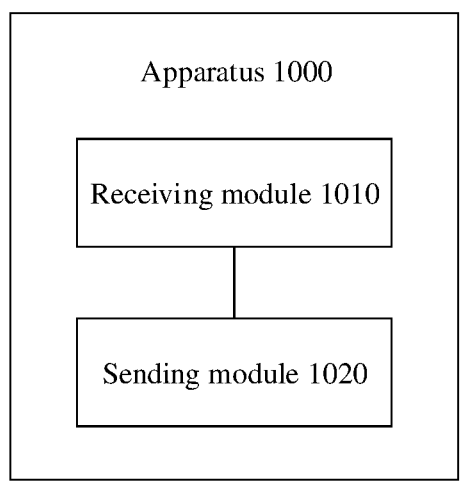
FIG. 10 is a schematic block diagram of a link failure report transmission apparatus according to an embodiment of this application.

FIG. 10 is a schematic block diagram of a link failure report transmission apparatus 1000 according to an embodiment of this application.

It should be understood that the apparatus 1000 may correspond to the second radio access network device in the embodiments shown in FIG. 4 to FIG. 7, and may have any function of the second radio access network device in the methods. The apparatus 1000 includes a receiving module 1010 and a sending module 1020.

The receiving module 1010 is configured to receive a first link failure report from a terminal, where the first link failure report is used to indicate that a link between the terminal and a first radio access network device fails, and the first radio access network device is a secondary access network device of a third radio access network device.

The sending module 1020 is configured to send the first link failure report to the third radio access network device.

Optionally, the receiving module 1010 is further configured to receive a second link failure report from the terminal, where the second link failure report is used to indicate that a link between the terminal and a fourth radio access network device fails.

Optionally, a first message includes the first link failure report and the second link failure report.

Optionally, the second link failure report includes: cell information of a first cell, where the first cell is within coverage of the fourth radio access network device, and a link failure occurs between the terminal and the first cell; a type of the link failure that occurs in the first cell; cell information of a primary cell of a cell in which a connection failure occurs or cell information of a cell in which a handover command is received for the last time; cell information of a cell that is served by a radio access network device and in which the terminal successfully reestablishes a connection; a time interval between a moment at which the link between the terminal and the first radio access network device fails and a moment at which the link between the terminal and the fourth radio access network device fails; a time interval between the moment at which the link between the terminal and the fourth radio access network device fails and a moment at which a link between the terminal and the second radio access network device is successfully established; a time interval between a moment at which the handover command is received and the moment at which the link between the terminal and the fourth radio access network device fails; an identifier of the terminal; and a result of measurement between a neighboring cell of the first cell and the terminal.

Optionally, the first link failure report includes at least one of the following: cell information of a second cell, where the second cell is within coverage of the first radio access network device, and a link failure occurs between the terminal and the second cell; a type of the link failure that occurs in the second cell; cell information of a cell covered by a master access network device corresponding to the second cell; a time interval between the moment at which the link between the terminal and the first radio access network device fails and a moment at which the terminal is handed over from the third radio access network device to the second radio access network device; the identifier of the terminal; location information of the terminal; a result of measurement between the terminal and each primary cell in a master cell group; and a result of measurement between the terminal and each secondary cell in a secondary cell group.

Optionally, when the terminal receives the handover command, the first link failure report further includes at least one of a time interval between the moment at which the handover command is received and the moment at which the link between the terminal and the first radio access network device fails and a time interval between the moment at which the handover command is received and the moment at which the terminal is handed over from the third radio access network device to the second radio access network device.

Figure 11:
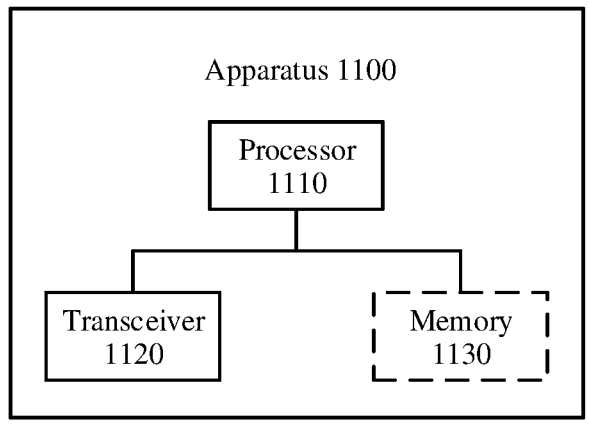
FIG. 11 is a schematic block diagram of a link failure report transmission apparatus according to an embodiment of this application.

FIG. 11 is a schematic block diagram of a link failure report transmission apparatus 1100 according to an embodiment of this application. The apparatus 1100 may be the radio access network device in FIG. 10. The apparatus may use a hardware architecture shown in FIG. 11. The apparatus may include a transceiver 1120. Optionally, the apparatus may further include a processor 1110 and a memory 1130. The processor 1110, the transceiver 1120, and the memory 1130 communicate with each other through an internal connection path. Related functions implemented by the receiving module 1010 and the sending module 1020 may be implemented by the processor 1110 by controlling the transceiver 1120.

Optionally, the processor 1110 may be a CPU, a microprocessor, an ASIC, a special-purpose processor, or one or more integrated circuits configured to perform the technical solutions in the embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control the link failure report transmission apparatus (for example, a base station, a terminal, or a chip), execute a software program, and process data of the software program.

Optionally, the processor 1110 may include one or more processors, for example, include one or more CPUs. When the processor is one CPU, the CPU may be a single-core CPU or a multi-core CPU.

The transceiver 1120 is configured to send data and/or a signal, and receive data and/or a signal. The transceiver may include a transmitter and a receiver. The transmitter is configured to send data and/or a signal, and the receiver is configured to receive data and/or a signal.

The memory 1130 includes but is not limited to a RAM, a ROM, an EPROM, and a CD-ROM. The memory 1130 is configured to store related instructions and related data.

The memory 1130 is configured to store program code and data of the radio access network device, and may be a separate device or integrated into the processor 1110.

Specifically, the processor 1110 is configured to control the transceiver to perform information transmission with the radio access network device. For details, refer to the descriptions in the foregoing method embodiments. Details are not described herein again.

During specific implementation, in an embodiment, the apparatus 1100 may further include an output device and an input device. The output device communicates with the processor 1110, and may display information in a plurality of manners. For example, the output device may be an LCD, an LED display device, a CRT display device, or a projector. When communicating with the processor, the input device may receive an input from a user in a plurality of manners. For example, the input device may be a mouse, a keyboard, a touchscreen device, or a sensor device.

It may be understood that FIG. 11 shows only a simplified design of a link failure report transmission apparatus. During actual application, the apparatus may further include other necessary components, including but not limited to any quantity of transceivers, processors, controllers, memories, and the like, and all radio access network devices that can implement this application shall fall within the protection scope of this application.

In a possible design, the apparatus 1100 may be a chip, for example, may be a communication chip that can be used in the radio access network device, and is configured to implement a related function of the processor 1110 in the radio access network device. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a radio access network device or a circuit. The apparatus may be configured to perform an action performed by the radio access network device in the foregoing method embodiments.

Figure 12:
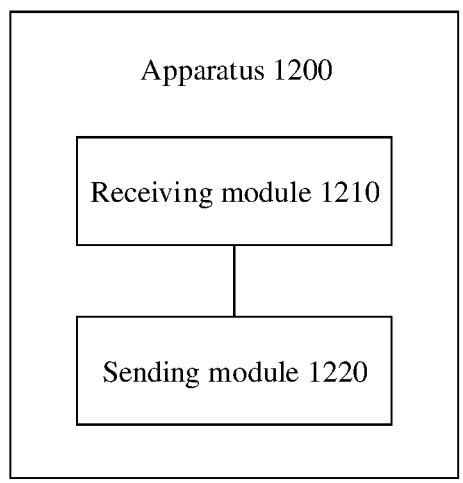
FIG. 12 is a schematic block diagram of a link failure report transmission apparatus according to an embodiment of this application.

FIG. 12 is a schematic block diagram of a link failure report transmission apparatus 1200 according to an embodiment of this application.

It should be understood that the apparatus 1200 may correspond to the third radio access network device in the embodiments shown in FIG. 4 to FIG. 7, and may have any function of the third radio access network device in the methods. The apparatus 1200 includes a receiving module 1210 and a sending module 1220.

The receiving module 1210 is configured to receive a first link failure report from a second radio access network device, where the first link failure report is used to indicate that a link between a terminal and a first radio access network device fails, and the first radio access network device is a secondary access network device of a third radio access network device.

The sending module 1220 is further configured to send the link failure report to the first radio access network device.

Optionally, the sending module 1220 is further configured to send a handover command to the terminal, where the handover command is used to indicate the terminal to be handed over from the third radio access network device to the second radio access network device.

Optionally, the receiving module 1210 is further configured to: receive a second link failure report from the terminal when the terminal reestablishes a connection to the third radio access network device, where the second link failure report is used to indicate that a link between the terminal and the second radio access network device fails.

Optionally, the receiving module 1210 is specifically configured to receive a first message from the terminal, where the first message includes the first link failure report and the second link failure report.

Optionally, the second link failure report includes: cell information of a first cell, where the first cell is within coverage of a fourth radio access network device, and a link failure occurs between the terminal and the first cell; a type of the link failure that occurs in the first cell; cell information of a primary cell of a cell in which a connection failure occurs or cell information of a cell in which the handover command is received for the last time; cell information of a cell that is served by a radio access network device and in which the terminal successfully reestablishes a connection; a time interval between a moment at which the link between the terminal and the first radio access network device fails and a moment at which a link between the terminal and the fourth radio access network device fails; a time interval between the moment at which the link between the terminal and the fourth radio access network device fails and a moment at which the link between the terminal and the second radio access network device is successfully established; a time interval between a moment at which the handover command is received and the moment at which the link between the terminal and the fourth radio access network device fails; an identifier of the terminal; and a result of measurement between a neighboring cell of the first cell and the terminal.

Optionally, the first link failure report includes at least one of the following: cell information of a second cell, where the second cell is within coverage of the first radio access network device, and a link failure occurs between the terminal and the second cell; a type of the link failure that occurs in the second cell; cell information of a cell covered by a master access network device corresponding to the second cell; a time interval between the moment at which the link between the terminal and the first radio access network device fails and a moment at which the terminal is handed over from the third radio access network device to the second radio access network device; the identifier of the terminal; location information of the terminal; a result of measurement between the terminal and each primary cell in a master cell group; and a result of measurement between the terminal and each secondary cell in a secondary cell group.

Optionally, when the third radio access network device sends the handover command to the terminal, and the terminal receives the handover command, the first link failure report further includes at least one of a time interval between the moment at which the handover command is received and the moment at which the link between the terminal and the first radio access network device fails and a time interval between the moment at which the handover command is received and the moment at which the terminal is handed over from the third radio access network device to the second radio access network device.

Figure 13:
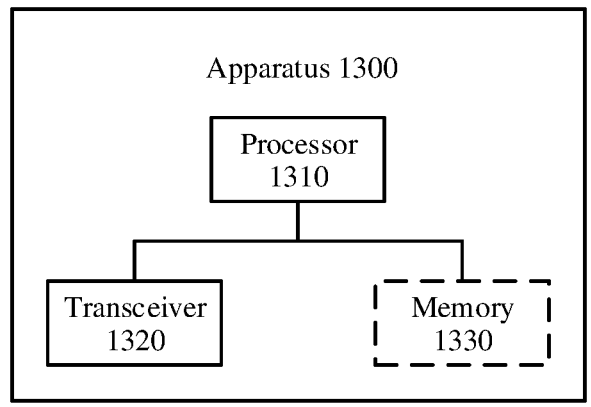
FIG. 13 is a schematic block diagram of a link failure report transmission apparatus according to an embodiment of this application.

FIG. 13 is a schematic block diagram of a link failure report transmission apparatus 1300 according to an embodiment of this application. The apparatus 1300 may be the radio access network device in FIG. 12. The apparatus may use a hardware architecture shown in FIG. 13. The apparatus may include a transceiver 1320. Optionally, the apparatus may further include a processor 1310 and a memory 1330. The processor 1310, the transceiver 1320, and the memory 1330 communicate with each other through an internal connection path. Related functions implemented by the receiving module 1210 and the sending module 1220 may be implemented by the processor 1310 by controlling the transceiver 1320.

Optionally, the processor 1310 may be a CPU, a microprocessor, an ASIC, a special-purpose processor, or one or more integrated circuits configured to perform the technical solutions in the embodiments of this application. Alternatively, the processor may be one or more devices, circuits, and/or processing cores configured to process data (for example, computer program instructions). For example, the processor may be a baseband processor or a central processing unit. The baseband processor may be configured to process a communication protocol and communication data. The central processing unit may be configured to control the link failure report transmission apparatus (for example, a base station, a terminal, or a chip), execute a software program, and process data of the software program.

Optionally, the processor 1310 may include one or more processors, for example, include one or more CPUs. When the processor is one CPU, the CPU may be a single-core CPU or a multi-core CPU.

The transceiver 1320 is configured to send data and/or a signal, and receive data and/or a signal. The transceiver may include a transmitter and a receiver. The transmitter is configured to send data and/or a signal, and the receiver is configured to receive data and/or a signal.

The memory 1330 includes but is not limited to a RAM, a ROM, an EPROM, and a CD-ROM. The memory 1330 is configured to store related instructions and related data.

The memory 1330 is configured to store program code and data of the radio access network device, and may be a separate device or integrated into the processor 1310.

Specifically, the processor 1310 is configured to control the transceiver to perform information transmission with a radio access network device. For details, refer to the descriptions in the foregoing method embodiments. Details are not described herein again.

During specific implementation, in an embodiment, the apparatus 1300 may further include an output device and an input device. The output device communicates with the processor 1310, and may display information in a plurality of manners. For example, the output device may be an LCD, an LED display device, a CRT display device, or a projector. When communicating with the processor, the input device may receive an input from a user in a plurality of manners. For example, the input device may be a mouse, a keyboard, a touchscreen device, or a sensor device.

It may be understood that FIG. 13 shows only a simplified design of a link failure report transmission apparatus. During actual application, the apparatus may further include other necessary components, including but not limited to any quantity of transceivers, processors, controllers, memories, and the like, and all radio access network devices that can implement this application shall fall within the protection scope of this application.

In a possible design, the apparatus 1300 may be a chip, for example, may be a communication chip that can be used in the radio access network device, and is configured to implement a related function of the processor 1310 in the radio access network device. The chip may be a field programmable gate array, a dedicated integrated chip, a system chip, a central processing unit, a network processor, a digital signal processing circuit, or a microcontroller for implementing a related function, or may be a programmable controller or another integrated chip. Optionally, the chip may include one or more memories, configured to store program code. When the code is executed, the processor is enabled to implement a corresponding function.

An embodiment of this application further provides an apparatus. The apparatus may be a radio access network device or a circuit. The apparatus may be configured to perform an action performed by the radio access network device in the foregoing method embodiments.

Figure 14:
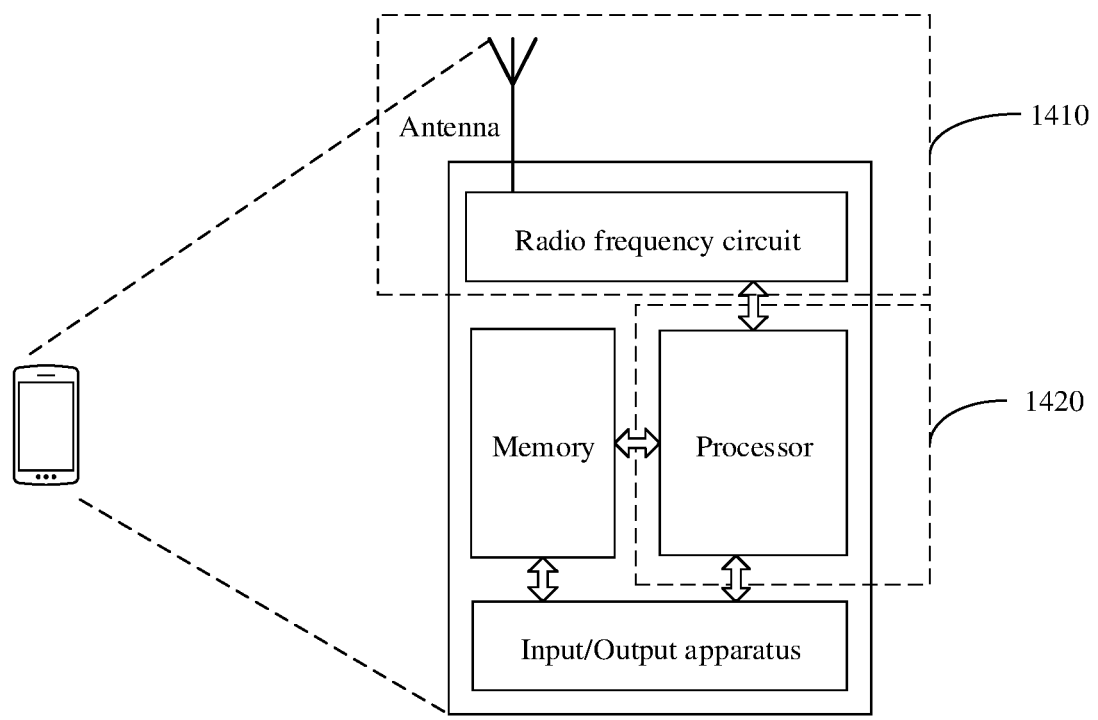
FIG. 14 is a simplified schematic diagram of a structure of a terminal according to an embodiment of this application.

Optionally, when the apparatus in this embodiment is a terminal, FIG. 14 is a simplified schematic diagram of a structure of a terminal. For ease of understanding and convenience of figure illustration, an example in which the terminal is a mobile phone is used in FIG. 14. As shown in FIG. 14, the terminal includes a processor, a memory, a radio frequency circuit, an antenna, and an input/output apparatus. The processor is mainly configured to: process a communication protocol and communication data, control the terminal, execute a software program, process data of the software program, and so on. The memory is mainly configured to store the software program and data. A radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus such as a touchscreen, a display, or a keyboard is mainly configured to: receive data entered by a user, and output data to the user. It should be noted that some types of terminals may not have the input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 14 shows only one memory and one processor. In an actual terminal product, there may be one or more processors and one or more memories. The memory may also be referred to as a storage medium, a storage device, or the like. The memory may be disposed independent of the processor, or may be integrated with the processor. This is not limited in the embodiments of this application.

In this embodiment of this application, the antenna and the radio frequency circuit that have sending and receiving functions may be considered as a transceiver unit of the terminal, and the processor that has a processing function may be considered as a processing unit of the terminal. As shown in FIG. 14, the terminal includes a transceiver unit 1410 and a processing unit 1420. The transceiver unit may also be referred to as a transceiver, a transceiver, a transceiver apparatus, or the like. The processing unit may also be referred to as a processor, a processing board, a processing module, a processing apparatus, or the like. Optionally, a component that is in the transceiver unit 1410 and that is configured to implement a receiving function may be considered as a receiving unit, and a component that is in the transceiver unit 1410 and that is configured to implement a sending function may be considered as a sending unit. In other words, the transceiver unit 1410 includes the receiving unit and the sending unit. The transceiver unit may also be sometimes referred to as a transceiver, a transceiver, a transceiver circuit, or the like. The receiving unit may also be sometimes referred to as a receiver, a receiver, a receiver circuit, or the like. The sending unit may also be sometimes referred to as a transmitter, a transmitter, a transmitter circuit, or the like.

It should be understood that the transceiver unit 1410 is configured to perform a sending operation and a receiving operation on the terminal side in the foregoing method embodiments, and the processing unit 1420 is configured to perform operations other than the sending and receiving operations of the terminal in the foregoing method embodiments.

For example, in an implementation, the processing unit 1420 is configured to perform the processing step on the terminal side. The transceiver unit 1410 is configured to perform the sending operation and the receiving operation in step 401 in FIG. 4, and/or the transceiver unit 1410 is further configured to perform other sending and receiving steps on the terminal side in the embodiments of this application. Alternatively, the transceiver unit 1410 is configured to perform the sending operation and the receiving operation in step 501, step 502, or step 503 in FIG. 5, and/or the transceiver unit 1410 is further configured to perform other sending and receiving steps on the terminal side in the embodiments of this application. Alternatively, the transceiver unit 1410 is configured to perform the sending operation and the receiving operation in step 601, step 602, step 603, or step 604 in FIG. 6, and/or the transceiver unit 1410 is further configured to perform other sending and receiving steps on the terminal side in the embodiments of this application. Alternatively, the transceiver unit 1410 is configured to perform the sending operation and the receiving operation in step 701 in FIG. 7, and/or the transceiver unit 1410 is further configured to perform other sending and receiving steps on the terminal side in the embodiments of this application.

When the communication apparatus is a chip, the chip includes a transceiver unit and a processing unit. The transceiver unit may be an input/output circuit or a communication interface. The processing unit is a processor, a microprocessor, or an integrated circuit integrated on the chip.

Figure 15:
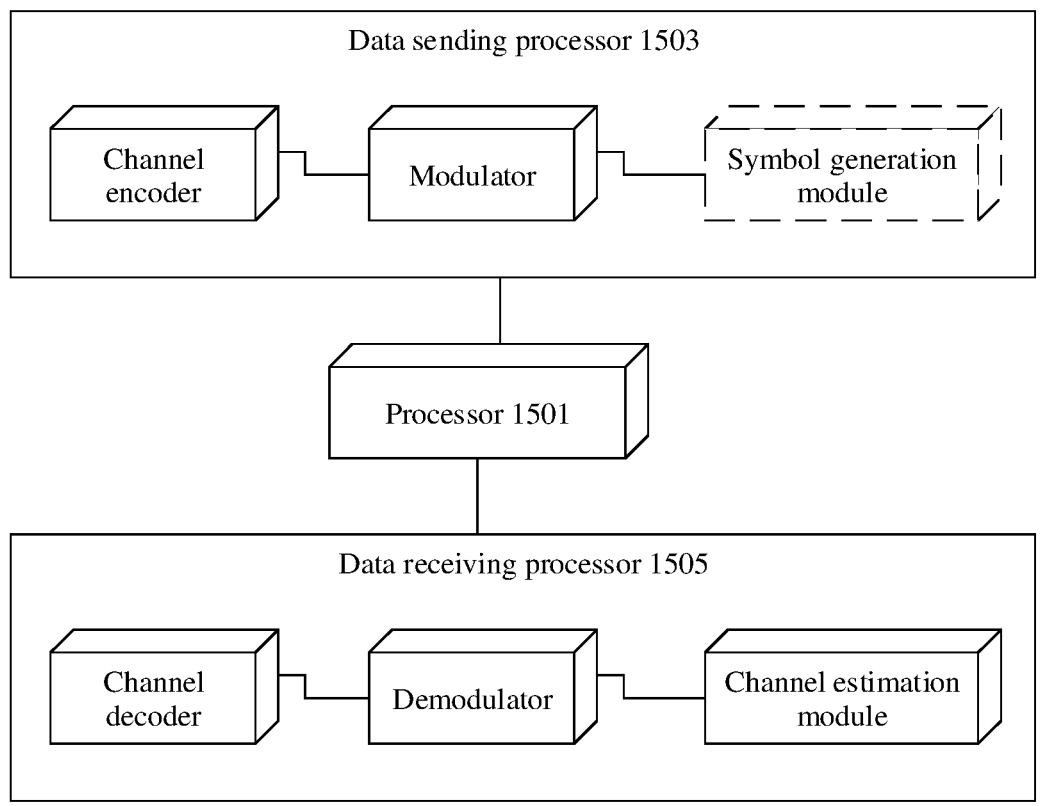
FIG. 15 is a simplified schematic diagram of a structure of another terminal according to an embodiment of this application.

Optionally, when the apparatus is a terminal, reference may be further made to a device shown in FIG. 15. In an example, the device may implement a function similar to that of the processor 1410 in FIG. 14. In FIG. 15, the device includes a processor 1501, a data sending processor 1503, and a data receiving processor 1505. The processing module in the foregoing embodiment may be the processor 1501 in FIG. 15, and implements a corresponding function. Although a channel encoder and a channel decoder are shown in the FIG. 15, it may be understood that the modules are merely an example, and do not constitute a limitation on this embodiment.

Figure 16:
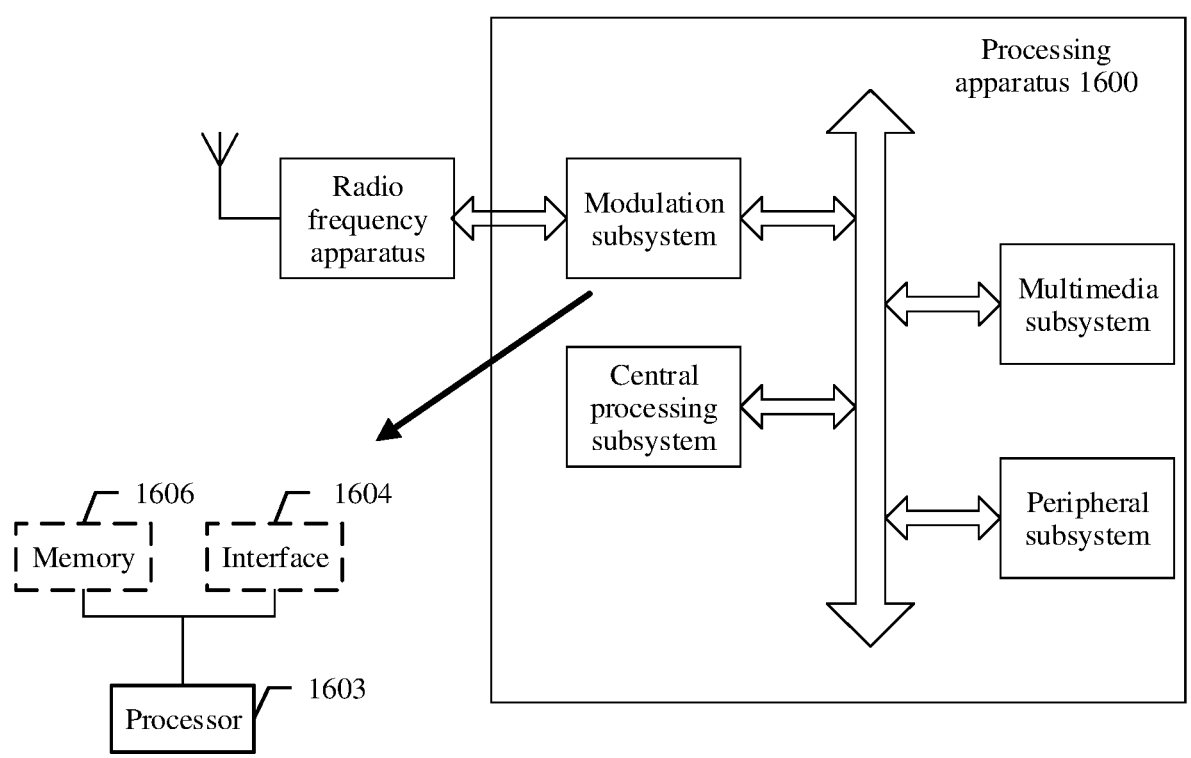
FIG. 16 is a schematic diagram of a structure of a form of another terminal according to an embodiment of this application.

FIG. 16 shows a form of another terminal according to this embodiment. A processing apparatus 1600 includes modules such as a modulation subsystem, a central processing subsystem, and a peripheral subsystem. The communication device in this embodiment may be used as the modulation subsystem in the processing apparatus 1600. Specifically, the modulation subsystem may include a processor 1603 and an interface 1604. The processor 1603 implements a function of the processing module, and the interface 1604 implements a function of the transceiver module. As another variation, the modulation subsystem includes a memory 1606, a processor 1603, and a program that is stored in the memory and that can be run on the processor. The processor executes the program to implement the methods in the foregoing embodiments. It should be noted that the memory 1606 may be nonvolatile or volatile. The memory 1606 may be located in the modulation subsystem, or may be located in the processing apparatus 1600, as long as the memory 1606 can be connected to the processor 1603.

Figure 17:
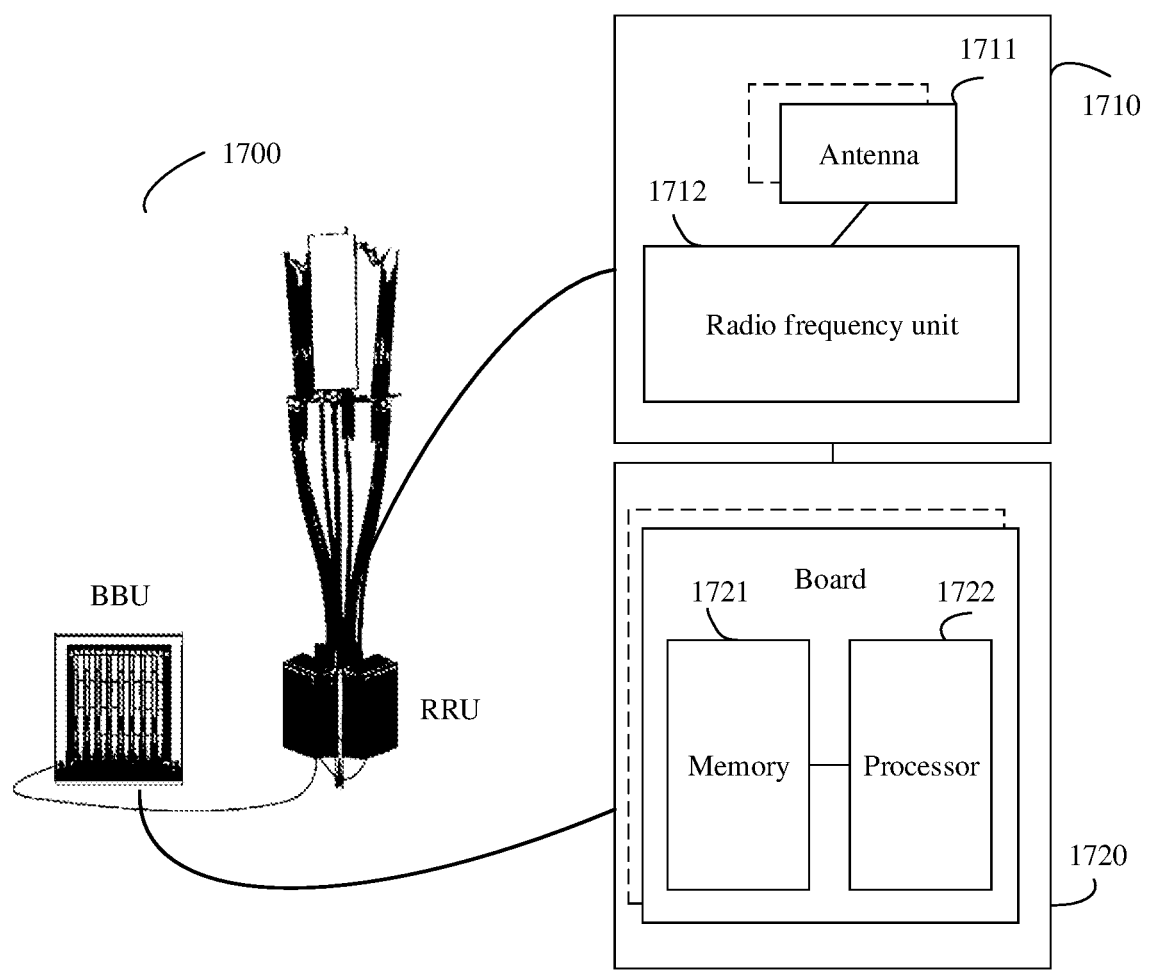
FIG. 17 is a schematic diagram of a structure of a form of an access network device according to an embodiment of this application.

When the apparatus in this embodiment is an access network device, the access network device may be that shown in FIG. 17. The apparatus 1700 includes one or more radio frequency units, for example, a remote radio unit (RRU) 1710 and one or more BBUs (which may also be referred to as digital units, DUs) 1720. The RRU 1710 may be referred to as a transceiver module, and corresponds to the receiving module and the sending module. Optionally, the transceiver module may also be referred to as a transceiver, a transceiver circuit, a transceiver, or the like, and may include at least one antenna 1711 and a radio frequency unit 1712. The RRU 1710 is mainly configured to: receive and send a radio frequency signal, and perform conversion between the radio frequency signal and a baseband signal. For example, the RRU 1710 is configured to send indication information to a terminal device. The BBU 1710 is mainly configured to: perform baseband processing, control a base station, and so on. The RRU 1710 and the BBU 1720 may be physically disposed together, or may be physically separated, namely, a distributed base station.

The BBU 1720 is a control center of the base station, and may also be referred to as a processing module. The BBU 1720 may correspond to the processing module, and is mainly configured to implement a baseband processing function such as channel coding, multiplexing, modulation, or spreading. For example, the BBU (the processing module) may be configured to control the base station to perform an operation procedure related to the access network device in the foregoing method embodiments, for example, generate the indication information.

In an example, the BBU 1720 may include one or more boards, and a plurality of boards may jointly support a radio access network (such as an LTE network) having a single access standard, or may separately support radio access networks (for example, an LTE network, a 5G network, or another network) having different access standards. The BBU 1720 further includes a memory 1721 and a processor 1722. The memory 1721 is configured to store necessary instructions and necessary data. The processor 1722 is configured to control the base station to perform a necessary action, for example, configured to control the base station to perform an operation procedure related to the access network device in the foregoing method embodiments. The memory 1721 and the processor 1722 may serve one or more boards. In other words, the memory and the processor may be separately disposed on each board. Alternatively, a plurality of boards may share a same memory and a same processor. In addition, a necessary circuit may be further disposed on each board.

In addition, the access network device is not limited to the foregoing forms, and may alternatively be in another form. For example, the access network device includes a BBU and an adaptive radio unit (ARU), or includes a BBU and an active antenna unit (AAU), or may be customer premises equipment (CPE), or may be in another form. This is not limited in this application.

In another form of this embodiment, a computer-readable storage medium is provided. The computer-readable storage medium stores instructions. When the instructions are executed, the methods in the foregoing method embodiments are performed.

In another form of this embodiment, a computer program product including instructions is provided. When the instructions are executed, the methods in the foregoing method embodiments are performed.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, all or some of the procedure or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high density digital video disc (DVD)), a semiconductor medium (for example, a solid-state drive (solid state disk, SSD)), or the like.

It should be understood that, the processor may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in the embodiments of this application. The general-purpose processor may be a microprocessor, or the processor may be any conventional processor or the like. Steps of the methods disclosed with reference to the embodiments of this application may be directly performed and completed by a hardware decoding processor, or may be performed and completed by using a combination of hardware and software modules in the decoding processor. The software module may be located in a mature storage medium in the art, for example, a random access memory, a flash memory, a read-only memory, a programmable read-only memory, an electrically erasable programmable memory, or a register. The storage medium is located in the memory, and the processor reads information in the memory and completes the steps of the foregoing method in combination with hardware of the processor.

It may be understood that the memory in the embodiments of this application may be a volatile memory or a non-volatile memory, or may include both a volatile memory and a non-volatile memory. The non-volatile memory may be a ROM, a PROM, an EPROM, an EEPROM, or a flash memory. The volatile memory may be a RAM and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchronous link DRAM, SLDRAM), and a direct rambus random access memory (direct rambus RAM, DR RAM).

In this application, at least one means one or more, and a plurality of means two or more. "And/or" describes an association relationship between associated objects, and indicates that three relationships may exist. For example, A and/or B may indicate the following cases: Only A exists, both A and B exist, and only B exists, where A and B may be singular or plural. The character "/" generally indicates an "or" relationship between the associated objects. The term "at least one of the following items (pieces)" or a similar expression thereof means any combination of these items, including a single item (piece) or any combination of a plurality of items (pieces). For example, at least one of a, b, or c may indicate: a, b, c, a and b, a and c, b and c, or a, b, and c, where a, b, and c may be singular or plural.

It should be understood that "one embodiment" or "an embodiment" mentioned in the entire specification means that particular features, structures, or characteristics related to the embodiments are included in at least one embodiment of this application. Therefore, "in one embodiment" or "in an embodiment" appearing in the entire specification does not necessarily refer to a same embodiment. In addition, these particular features, structures, or characteristics may be combined in one or more embodiments in any proper manner. It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

Terminologies such as "component", "module", and "system" used in this specification are used to indicate computer-related entities, hardware, firmware, combinations of hardware and software, software, or software being executed. For example, a component may be but is not limited to a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. The components may communicate with each other by using a local and/or remote process and based on, for example, a signal having one or more data packets (for example, data from two components interacting with another component in a local system or a distributed system and/or across a network such as the internet interacting with other systems by using a signal).

It should be further understood that "first", "second", and various numerical symbols in this specification are merely used for distinguishing for ease of description, and are not intended to limit the scope of the embodiments of this application.

It should be understood that, the term "and/or" in this specification describes only an association relationship between associated objects, and indicates that three relationships may exist. For example, A and/or B may indicate the following three cases: Only A exists, both A and B exist, and only B exists. When only A or only B exists, a quantity of A or B is not limited. In an example in which only A exists, it may be understood as that there is one or more A.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, function units in the embodiments of this application may be integrated into one processing unit, each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, or a radio access network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:
   sending, by a terminal, a first link failure report to a second radio access network device that is to serve the terminal, wherein the first link failure report indicates that a link between the terminal and a first radio access network device fails, and the first radio access network device is a secondary radio access network device of a third radio access network device; and
   wherein sending, by the terminal, the first link failure report to the second radio access network device comprises:
   sending, by the terminal, the first link failure report to the second radio access network device when the terminal is successfully handed over from the third radio access network device to a fourth radio access network device and a link between the terminal and the fourth radio access network device fails within a preset time interval.

2. The method according to claim 1, wherein sending, by the terminal, the first link failure report to the second radio access network device further comprises:
sending, by the terminal, the first link failure report to the second radio access network device when the terminal is successfully handed over from the third radio access network device to the second radio access network device.

3. The method according to claim 1, wherein sending, by the terminal, the first link failure report to the second radio access network device further comprises:
sending, by the terminal, the first link failure report to the second radio access network device when the terminal successfully reestablishes a connection to the second radio access network device.

4. The method according to claim 1, wherein the second radio access network device and the third radio access network device are a same access network device.

5. The method according to claim 1, wherein the method further comprises:
sending, by the terminal, a second link failure report to the second radio access network device, wherein the second link failure report indicates that the link between the terminal and the fourth radio access network device fails.

6. The method according to claim 1, wherein sending, by the terminal, the first link failure report to the second radio access network device further comprises:
sending, by the terminal, the first link failure report to the second radio access network device when the terminal fails to be handed over from the third radio access network device to the fourth radio access network device.

7. The method according to claim 1, wherein the first link failure report comprises at least one of the following: cell information of a second cell, wherein the second cell is within coverage of the first radio access network device, and a link failure occurs between the terminal and the second cell; a type of the link failure that occurs in the second cell; cell information of a cell covered by a master access network device corresponding to the second cell; a time interval between a moment at which the link between the terminal and the first radio access network device fails and a moment at which the terminal is handed over from the third radio access network device to the second radio access network device; an identifier of the terminal; location information of the terminal; a result of measurement between the terminal and each primary cell in a master cell group; or a result of measurement between the terminal and each secondary cell in a secondary cell group.

8. An apparatus comprising:
at least one processor; and
a non-transitory memory coupled to the at least one processor, the memory comprising instructions that, when executed by the at least one processor, cause the apparatus to:
send a first link failure report to a second radio access network device that is to serve the apparatus, wherein the first link failure report indicates that a link between the apparatus and a first radio access network device fails, and the first radio access network device is a secondary radio access network device of a third radio access network device; and wherein sending the first link failure report to the second radio access network device that is to serve the apparatus comprises:
sending the first link failure report to the second radio access network device when the apparatus is successfully handed over from the third radio access network device to a fourth radio access network device and a link between the apparatus and the fourth radio access network device fails within a preset time interval.

9. The apparatus according to claim 8, wherein the instructions, when executed by the at least one processor, cause the apparatus further to:
send the first link failure report to the second radio access network device when the apparatus is successfully handed over from the third radio access network device to the second radio access network device.

10. The apparatus according to claim 8, wherein the instructions, when executed by the at least one processor, cause the apparatus further to:
send the first link failure report to the second radio access network device when the apparatus successfully reestablishes a connection to the second radio access network device.

11. The apparatus according to claim 8, wherein the second radio access network device and the third radio access network device are a same access network device.

12. The apparatus according to claim 8, wherein the instructions, when executed by the at least one processor, cause the apparatus further to:
send a second link failure report to the second radio access network device, wherein the second link failure report indicates that the link between the apparatus and the fourth radio access network device fails.

13. The apparatus according to claim 8, wherein the instructions, when executed by the at least one processor, cause the apparatus further to:
send the first link failure report to the second radio access network device when the apparatus fails to be handed over from the third radio access network device to the fourth radio access network device.

14. The apparatus according to claim 8, wherein the first link failure report comprises at least one of the following: cell information of a second cell, wherein the second cell is within coverage of the first radio access network device, and a link failure occurs between the apparatus and the second cell; a type of the link failure that occurs in the second cell; cell information of a cell covered by a master access network device corresponding to the second cell; a time interval between a moment at which the link between the apparatus and the first radio access network device fails and a moment at which the apparatus is handed over from the third radio access network device to the second radio access network device; an identifier of the apparatus; location information of the apparatus; a result of measurement between the apparatus and each primary cell in a master cell group; or a result of measurement between the apparatus and each secondary cell in a secondary cell group.

15. The apparatus according to claim 14, wherein the first link failure report further comprises at least one of following: a time interval between a moment at which a handover command is received by the apparatus and the moment at which the link between the apparatus and the first radio access network device fails, or a time interval between the moment at which the handover command is received and the moment at which the apparatus is handed over from the third radio access network device to the second radio access network device.

16. An apparatus comprising:
at least one processor; and
a non-transitory memory coupled to the at least one processor, the memory comprising instructions that, when executed by the at least one processor, cause the apparatus to:
receive a first link failure report from a terminal to be served by the apparatus, wherein the first link failure report indicates that a link between the terminal and a first radio access network device fails, and the first radio access network device is a secondary access network device of a third radio access network device;
send the first link failure report to the third radio access network device; and
receive a second link failure report from the terminal, wherein the second link failure report indicates that a link between the terminal and a fourth radio access network device fails.

17. The apparatus according to claim 16, wherein the first link failure report and the second link failure report are carried in one message.

18. The apparatus according to claim 16, wherein the second link failure report comprises at least one of following: cell information of a first cell, wherein the first cell is within coverage of the fourth radio access network device, and a link failure occurs between the terminal and the first cell; a type of the link failure that occurs in the first cell; cell information of a primary cell of a cell in which a connection failure occurs or cell information of a cell in which a handover command is received for the last time; cell information of a cell that is served by a radio access network device and in which the terminal successfully reestablishes a connection; a time interval between a moment at which the link between the terminal and the first radio access network device fails and a moment at which the link between the terminal and the fourth radio access network device fails; a time interval between the moment at which the link between the terminal and the fourth radio access network device fails and a moment at which a link between the terminal and the apparatus is successfully established; a time interval between a moment at which the handover command is received and the moment at which the link between the terminal and the fourth radio access network device fails; an identifier of the terminal; or a result of measurement between a neighboring cell of the first cell and the terminal.

19. The apparatus according to claim 16, wherein the first link failure report comprises at least one of the following: cell information of a second cell, wherein the second cell is within coverage of the first radio access network device, and a link failure occurs between the terminal and the second cell; a type of the link failure that occurs in the second cell; cell information of a cell covered by a master access network device corresponding to the second cell; a time interval between a moment at which the link between the terminal and the first radio access network device fails and a moment at which the terminal is handed over from the third radio access network device to the apparatus; an identifier of the terminal; location information of the terminal; a result of measurement between the terminal and each primary cell in a master cell group; or a result of measurement between the terminal and each secondary cell in a secondary cell group.

20. The apparatus according to claim 19, wherein the first link failure report further comprises at least one of following: a time interval between a moment at which a handover command is received by the terminal and the moment at which the link between the terminal and the first radio access network device fails, or a time interval between the moment at which the handover command is received and the moment at which the terminal is handed over from the third radio access network device to the apparatus.

\* \* \* \* \*